(12) United States Patent
Borodiak et al.

(10) Patent No.: US 10,587,690 B2
(45) Date of Patent: Mar. 10, 2020

(54) SYSTEMS AND METHODS FOR UTILIZING ATHLETE DATA TO INCREASE ATHLETE PERFORMANCE

(71) Applicant: On The Hop, LLC, Parkland, FL (US)

(72) Inventors: Ivan Borodiak, Parkland, FL (US); Sunil Irukulla, Philadelphia, PA (US)

(73) Assignee: On The Hop, LLC, Parkland, FL (US)

( * ) Notice: Subject to any disclaimer, the term of this patent is extended or adjusted under 35 U.S.C. 154(b) by 180 days.

(21) Appl. No.: 15/704,487

(22) Filed: Sep. 14, 2017

(65) Prior Publication Data

US 2018/0091594 A1 Mar. 29, 2018

Related U.S. Application Data

(60) Provisional application No. 62/394,450, filed on Sep. 14, 2016.

(51) Int. Cl.

| | |
|---|---|
| *H04L 29/08* | (2006.01) |
| *G06Q 50/00* | (2012.01) |
| *G06Q 30/06* | (2012.01) |
| *G06F 16/9535* | (2019.01) |
| *G06F 16/955* | (2019.01) |
| *A63B 71/06* | (2006.01) |

(52) U.S. Cl.
CPC ...... *H04L 67/1097* (2013.01); *G06F 16/9535* (2019.01); *G06F 16/9558* (2019.01); *G06Q 30/0601* (2013.01); *G06Q 50/01* (2013.01); *H04L 67/306* (2013.01); *A63B 71/0616* (2013.01)

(58) Field of Classification Search
CPC ............ H04L 67/1097; H04L 67/306; G06F 16/9558; G06Q 30/0601; G06Q 50/01
See application file for complete search history.

(56) References Cited

U.S. PATENT DOCUMENTS

2012/0166449 A1* 6/2012 Pitaliya ............... G06Q 10/00
707/748
2013/0139068 A1* 5/2013 Bowring ............ A63B 71/0616
715/747

* cited by examiner

*Primary Examiner* — Nasser M Goodarzi
*Assistant Examiner* — Adil Ocak
(74) *Attorney, Agent, or Firm* — Gregory L. Mayback; Dickinson Wright PLLC

(57) ABSTRACT

A three-dimensional interactive/digital locker room system that is developed for and accessible through the Internet, which accesses a database of profile/user data that is displayed in the three-dimensional digital, interactive locker room the "Interactive Locker Room System". Users in the Interactive Locker Room System can move around in first person movements, chat with users, open lockers to view profile data such as equipment and statistics, search for users, share their profiles with college coaches, and receive training, nutrition, and equipment recommendations. Profile data includes videos, images, and biographical data. The 3D interactive locker room system generates and displays featured athletes and videos, and favorite athletes. The interactive locker room system is incorporated into a web application, mobile application, and a virtual reality application. Coaches are able to manage player and team statistics, manage schedules and attendance, and receive training and nutrition recommendations.

5 Claims, 14 Drawing Sheets

SYSTEMS AND METHODS FOR UTILIZING ATHLETE DATA TO INCREASE ATHLETE PERFORMANCE

CROSS-REFERENCE TO RELATED APPLICATIONS

This application claims the priority, under 35 U.S.C. § 119, of U.S. Provisional Patent Application No. 62/394,450, filed Sep. 14, 2016; the prior application is herewith incorporated by reference herein in its entirety.

STATEMENT REGARDING FEDERALLY SPONSORED RESEARCH OR DEVELOPMENT

Not Applicable

FIELD OF THE INVENTION

The present systems, apparatuses, and methods lie in the general field of computerized social networks. The present disclosure relates to computerized social networks configured to retain, transfer, disseminate, and process data sets containing user-generated information regarding athletes and utilize that data to increase athlete performance.

BACKGROUND OF THE INVENTION

The Internet provides a number of social networking and media websites, such as Facebook®, LinkedIn®, Instagram®, and Twitter®, where a user can log in and create a page that is associated with that user. On his/her page, the user can post text, photographs, statuses, locations, and/or hypertext links, and the user may specify who can view the page. For example, the user can limit who can view the user's page only to those users with whom he/she has registered a relationship, such as Facebook "friends," Twitter or Instagram "followers," or LinkedIn "connections." The user may also limit their profile in a broader sense, by allowing those who have a preregistered relationship with the user to view the user's profile as well. The user may also choose to let the general public as a whole view his/her profile.

In these social networking and media websites, the page that the user organizes usually contains any content that the user chooses, which would be organized in a free-form way. As a result, a user's page does not have a standardized format that would easily and clearly present specific type(s) of information that might be desirable for certain types of users, such as an athlete in high school who wants specifically to present his personal performance data to potential recruiting colleges or professional teams.

Additionally, in typical computerized social network systems, specific performance data or other sport-related data about an individual athlete cannot be shared in the generic social networks in a way that other users can access easily. Typical computerized social network systems also do not allow for specific performance data or other sport-related data about many individual athletes to be used to develop general data about a distribution of different types of sport-related information or data over the population of users, as indexed by relevant sports-based or other criteria.

Furthermore, there is no current method for which athletic equipment companies can track in a single location how their equipment is being utilized and sold across various athletes in various sports. This information is unavailable from a single location to track and filter equipment use by various categories, such as in terms of their use, per athlete, by state, by city, and/or by age of the athlete.

Thus, a need exists to overcome the problems with the prior art systems, designs, and processes as discussed above.

SUMMARY OF THE INVENTION

The systems, apparatuses, and methods described provide an invention that revolutionizes and drastically improves the ability for athletic scouts to recruit potential prospects and that overcome the hereinafore-mentioned disadvantages of the heretofore-known devices and methods of this general type and that provides such features with a system and method for an interactive computerized social network operating over the Internet that provides capabilities lacking in the prior art.

With the foregoing and other objects in view, there is provided, a three-dimensional interactive and digital locker room system that is accessible through the Internet and accesses a database of profile and user data that is displayed in the three-dimensional, digital, and interactive locker room titled the "3D-Interactive Locker Room System." Users in the Interactive Locker Room System can move around using first person movements, chat with users, open lockers to view profile data such as equipment and statistics, search for users, and share their profiles with college coaches. Profile data includes videos, images, and biographical data. The 3D-Interactive Locker Room System generates and displays featured athletes and videos, as well as favorite athletes. Additionally, the 3D-Interactive Locker Room System can be incorporated into a web application, a mobile application, and a virtual reality application.

With the objects in view, there is also provided computerized social networking systems and methods that allow a user-athlete to set up a personal virtual locker within a larger virtual locker room that is shared with other users and to provide data or links in the user's virtual locker corresponding to information about the user, the user's particular sport activities, and metrics of the user's performance. All of this data is organized and presented in a standardized format, where each user has a virtual player card that can be reviewed, especially, by coaches who are considering the user for their particular athletic programs.

In an exemplary embodiment of the systems and methods, an individual user-athlete of the system communicates with a selected subset of coaches listed in a relational database of all coaches in a given area, such as a country (e.g., the U.S.), that is stored in a memory device accessible to the computers of the system. The selected subset of the coaches is created by the user submitting a query to search the database, such as for coaches in a given region for a sport of interest to the user, and then selecting some or all of the coaches identified by the resulting collection of records brought up by the query. The communication to the coach can be a transmission (via email or instant messaging) of a virtual player card containing relevant data for the user-athlete. The "player card" will be transmitted to the desired coaches that, for example, includes the desired or relevant data about the player. This player card can also contain a link that, when selected by the coach, re-directs the coach's computer browser to the virtual locker of the athlete-user who sent the player card and displays to the coach the data present in the user's virtual locker.

In an exemplary embodiment, the systems and methods allow a user reviewing contents of a locker of another user to be shown sports equipment that is endorsed by, or that has been selected or used by, the locker-owner, and the equipment displayed contains a link that connects the user with a web-based store from which the user can buy the sports equipment through an over-the-Internet transaction. This provides an ability for users to share their preferred equipment, thereby endorsing that equipment. The systems and methods capitalize on this purchasing opportunity by linking any other user who views this equipment to a store where that user can purchase the endorsed equipment, thereby revolutionizing marketing and purchasing potential of athletic equipment.

In an exemplary embodiment, the systems and methods allow for specific brands and models of athletic equipment to be tracked and measured in terms of their use, per athlete, by state, by city, and/or by age of the athlete. This information, offered by the systems and methods described herein, has heretofore been unavailable in any reasonably accessible way, and is invaluable for marketing by equipment manufacturers. Additionally, this information can be used as a source of financial income for the website administrator based on per-click or a percentage of sales generated, in addition to any benefits that the website administrator may receive for linking users to stores selling the equipment.

In an exemplary embodiment, computerized systems and methods administer a social networking system over the Internet that is searchable by its users. Exemplary searches yield demographic, age-specific, and/or any defining or other classification data for users of certain sports-related products that are endorsed, owned, and/or used by users of the social network, based on attributes of the user, such as gender, age, sport, physical attributes, position played, and other sports-related parameters.

With the foregoing and other objects in view, there is provided, a system for utilizing athlete data, comprising a system for utilizing athlete data comprising a player-card reader and a host server connected to the internet and hosting a host application. The host application is configured to communicate with computers separate from the host server and connected to the host server through the internet, the computers comprising at least one of a second server, a desktop, a laptop, a tablet, and a smartphone. The host application is configured to host a coach database comprising, for each coach, attributes including at least one of a coach name, a team name, a team gender, a team sport, a team association, a team classification, and a team location. The host application is configured to set up and store player lockers, each locker being associated with one player and comprising a unique player card containing player information comprising the player's unique identification, at least one picture of the player, biographical information about the player, and an equipment locker in which is stored equipment selected by the player. The host application is configured to receive the player information from the player and store the player information within the unique player card. The host application is configured to receive from the player a subset of coaches selected from the coach database. The host application is configured to transmit the unique player card through the internet to at least one coach who is contained within the coach database by at least one of email and text. The player-card reader is hosted on at least one of the computers separate from the host server and is configured to display to a user of the at least one computer the player information contained within the unique player card in a standardized display format.

In accordance with another feature, the host application is configured to send the unique player card to the subset of coaches contained within the coach database who are selected by the player.

In accordance with a further feature, the host application receives at least some of the player information from a coach associated with the player to store within the unique player card.

In accordance with a concomitant feature, the player-card reader also displays a hyperlink that, when selected, redirects a browser of the at least one computer to the player locker of the player who sent the unique player card and displays the player information present within the player locker.

Although the systems, apparatuses, and methods are illustrated and described herein as embodied in a system and method for an interactive computerized social network, it is, nevertheless, not intended to be limited to the details shown because various modifications and structural changes may be made therein without departing from the spirit of the invention and within the scope and range of equivalents of the claims. Additionally, well-known elements of exemplary embodiments will not be described in detail or will be omitted so as not to obscure the relevant details of the systems, apparatuses, and methods.

Additional advantages and other features characteristic of the systems, apparatuses, and methods will be set forth in the detailed description that follows and may be apparent from the detailed description or may be learned by practice of exemplary embodiments. Still other advantages of the systems, apparatuses, and methods may be realized by any of the instrumentalities, methods, or combinations particularly pointed out in the claims.

Other features that are considered as characteristic for the systems, apparatuses, and methods are set forth in the appended claims. As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one of ordinary skill in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the systems, apparatuses, and methods of the invention that are regarded as novel, it is believed that the systems, apparatuses, and methods will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the systems, apparatuses, and methods. Advantages of embodiments of the systems, apparatuses, and methods will be apparent from the following detailed description of the exemplary embodiments thereof, which description should be considered in conjunction with the accompanying drawings in which.

DETAILED DESCRIPTION OF THE EMBODIMENTS

Figure 1:
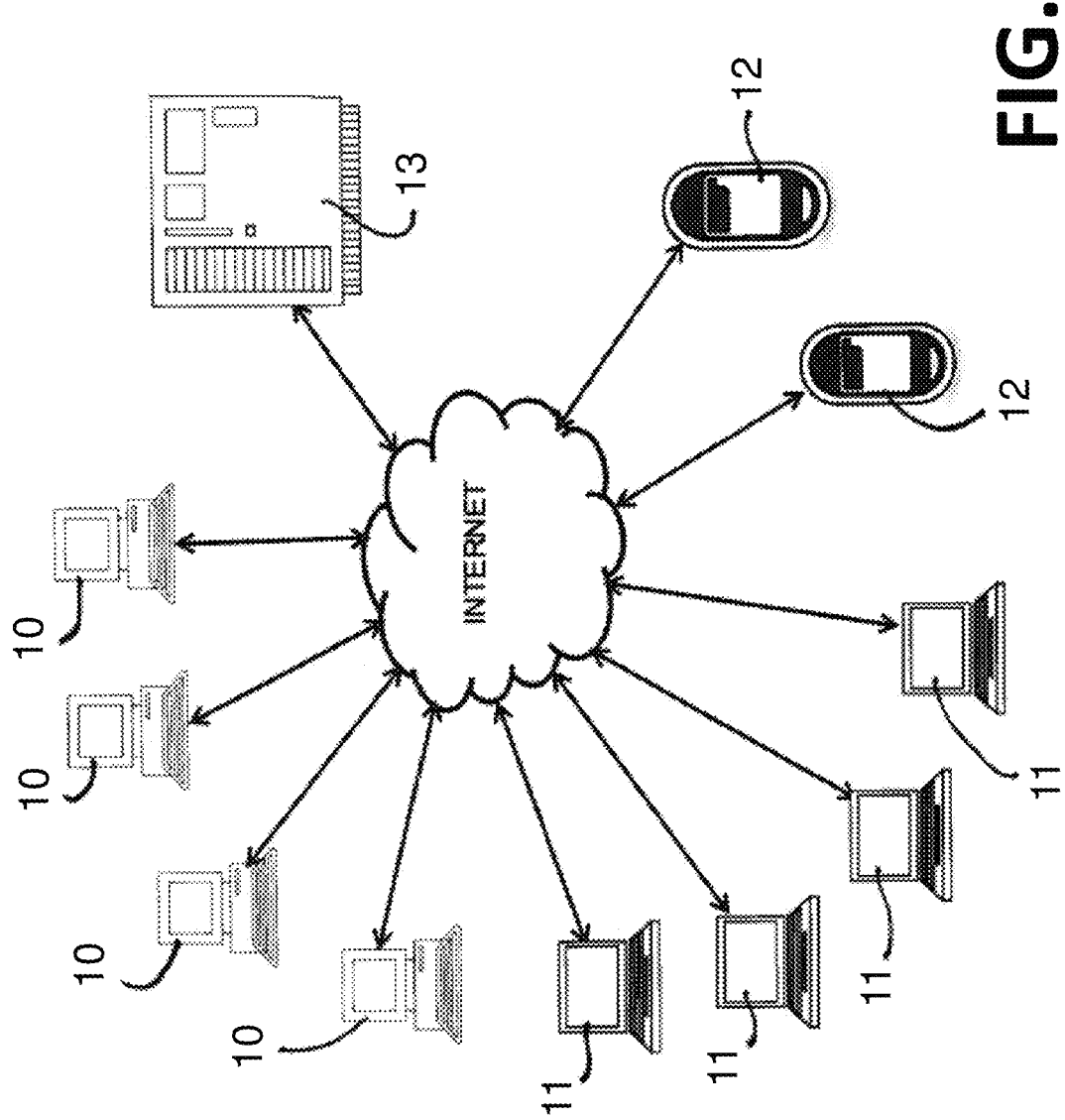
FIG. 1 is a diagrammatic representation of an exemplary embodiment of an overall distributed server-based system for an interactive computerized social network connected to the Internet.

As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one skilled in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the features of the systems, apparatuses, and methods that are regarded as novel, it is believed that the systems, apparatuses, and methods will be better understood from a consideration of the following description in conjunction with the drawing figures, in which like reference numerals are carried forward.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Alternate embodiments may be devised without departing from the spirit or the scope of the invention. Additionally, well-known elements of exemplary embodiments of the systems, apparatuses, and methods will not be described in detail or will be omitted so as not to obscure the relevant details of the systems, apparatuses, and methods.

Before the systems, apparatuses, and methods are disclosed and described, it is to be understood that the terminology used herein is for the purpose of describing particular embodiments only and is not intended to be limiting. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including" and/or "having," as used herein, are defined as comprising (i.e., open language). The terms "a" or "an", as used herein, are defined as one or more than one. The term "plurality," as used herein, is defined as two or more than two. The term "another," as used herein, is defined as at least a second or more. The description may use the terms "embodiment" or "embodiments," which may each refer to one or more of the same or different embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact (e.g., directly coupled). However, "coupled" may also mean that two or more elements are not in direct contact with each other, but yet still cooperate or interact with each other (e.g., indirectly coupled).

For the purposes of the description, a phrase in the form "A/B" or in the form "A and/or B" or in the form "at least one of A and B" means (A), (B), or (A and B), where A and B are variables indicating a particular object or attribute. When used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables, for example, a phrase in the form "at least one of A, B, and C" means (A), (B), (C), (A and B), (A and C), (B and C), or (A, B and C).

Relational terms such as first and second, top and bottom, and the like may be used solely to distinguish one entity or action from another entity or action without necessarily requiring or implying any actual such relationship or order between such entities or actions. The description may use perspective-based descriptions such as up/down, back/front, top/bottom, and proximal/distal. Such descriptions are merely used to facilitate the discussion and are not intended to restrict the application of disclosed embodiments. Various operations may be described as multiple discrete operations in turn, in a manner that may be helpful in understanding embodiments; however, the order of description should not be construed to imply that these operations are order dependent.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. As used herein, the terms "substantial" and "substantially" means, when comparing various parts to one another, that the parts being compared are equal to or are so close enough in dimension that one skill in the art would consider the same. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be a reasonable tolerance for the parts mentioned.

It will be appreciated that embodiments of the systems, apparatuses, and methods described herein may be comprised of one or more processors and unique stored program instructions that control the one or more processors to implement, in conjunction with certain non-processor circuits and other elements, some, most, or all of the functions of the devices and methods described herein. The non-processor circuits may include, but are not limited to, signal drivers, clock circuits, power source circuits, and user input and output elements. Alternatively, some or all functions could be implemented by a state machine that has no stored program instructions, or in one or more application specific integrated circuits (ASICs) or field-programmable gate arrays (FPGA), in which each function or some combinations of certain of the functions are implemented as custom logic. Of course, a combination of these approaches could also be used. Thus, methods and means for these functions have been described herein.

The terms "program," "software," "software application," and the like as used herein, are defined as a sequence of instructions designed for execution on a computer system or programmable device. A "program," "software," "application," "computer program," or "software application" may include a subroutine, a function, a procedure, an object method, an object implementation, an executable application, an applet, a servlet, a source code, an object code, any computer language logic, a shared library/dynamic load library and/or other sequence of instructions designed for execution on a computer system.

Herein various embodiments of the systems, apparatuses, and methods are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments. Referring now to the figures of the drawings in detail and first, particularly to FIG. 1, there is shown a first exemplary embodiment of a diagrammatic representation of the overall distributed server-based system for an interactive computerized social network connected to the Internet.

As best seen in FIG. 1, a number of users are connected to the Internet by a variety of hardware devices, for example, by desktop computers 10 or laptops/tablets 11 that each comprise a computer processor, a mass data storage device connected with the processor, each specific to the hardware device in which it resides, a keyboard, a display or monitor, and input devices such as a computer mouse, as well as software stored on the data storage device so it can be executed by the processor. This software can include any of a variety of operating systems, such as Windows®, Apple®, or Linux® operating systems, and a browser program such as Microsoft Internet Explorer®, Microsoft Edge®, Apple Safari®, Google Chrome®, Mozilla Firefox®, or any of a variety of Internet browsers.

Alternatively, users may connect to the Internet using smartphones 12, which are also computer processors containing data storage and software that executes an operating system, for example, like Android® or iOS® operating systems, as well as respective application for each operating system that accesses the Internet in a more directed way.

All of these devices 10, 11, and 12, communicate over the Internet and access at least one server 13 that is also connected to the Internet and receives and transmits data across the Internet. The at least one server 13 comprises one or more computer data processing systems all connected with a data storage device that supports a common database (s) stored thereon, and is shared among the server computers by computer architecture. The server 13 exchanges information over the Internet with the various computers 10, 11, and 12, usually using the http format, and the server 13 is accessed over the Internet by its worldwide web URL designation, for example, www.onthehopnation.com.

Figure 1B:
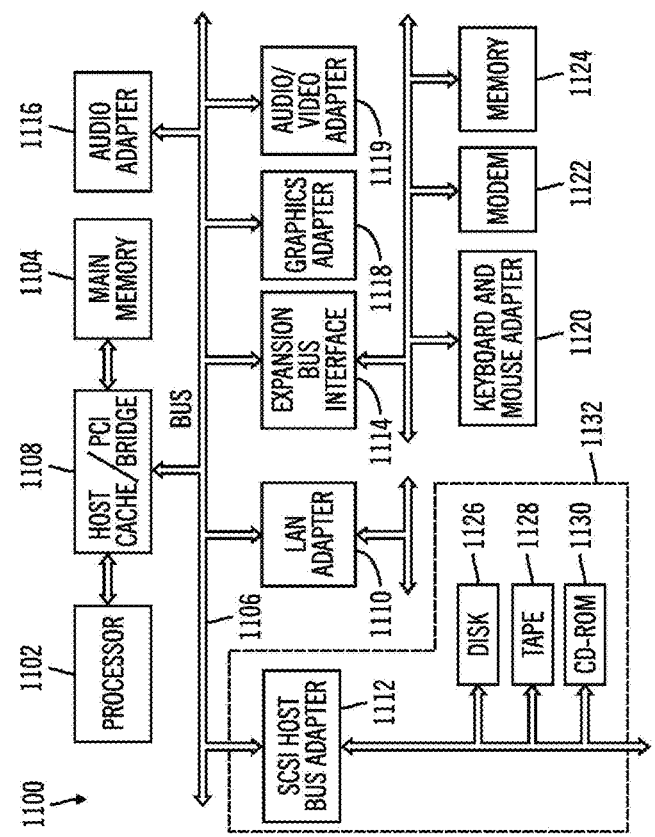
FIG. 1B is a block circuit diagram of an exemplary embodiment of a computer in the system of FIG. 1.
Figure 1A:
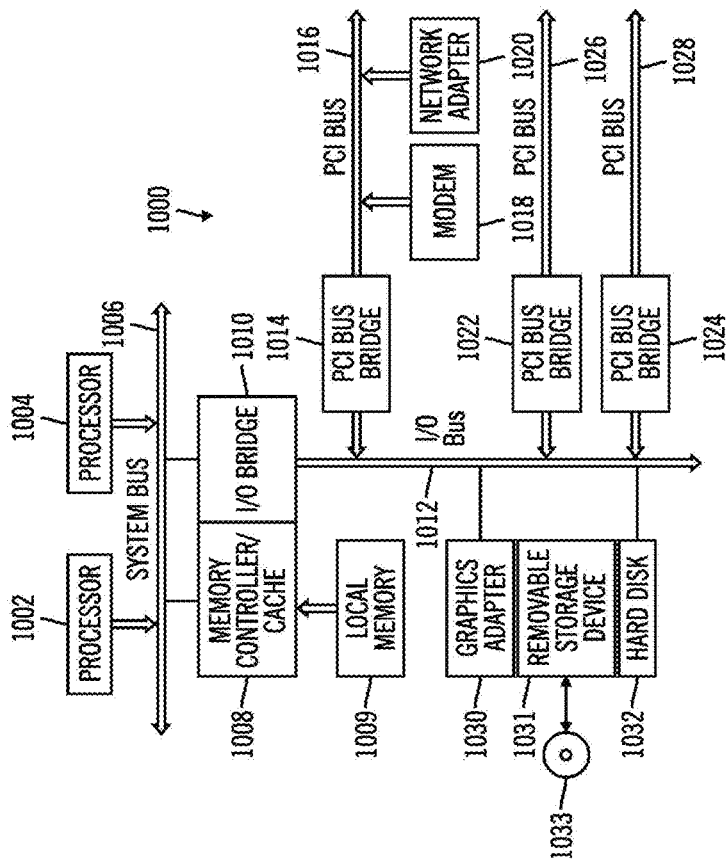
FIG. 1A is a block circuit diagram of an exemplary embodiment of a server in the system of FIG. 1.

Referring now to FIG. 1A, a block diagram of a data processing system that may be implemented as a server, such as 13 in FIG. 1, is depicted in accordance with one exemplary embodiment. A data processing system 1000 may be a symmetric multiprocessor (SMP) system including a plurality of processors 1002, 1004 connected to a system bus 1006. Alternatively, a single processor system may be employed. Also connected to a system bus 1006 is a memory controller/cache 1008, which provides an interface to a local memory 1009. An I/O bus bridge 1010 is connected to a system bus 1006 and provides an interface to an I/O bus 1012. A memory controller/cache 1008 and an I/O bus bridge 1010 may be integrated as depicted in FIG. 1A. The processor, as depicted by 1002 or 1004, or by a single processor in a single processor system, can also work in conjunction with any other memory device or storage locations, such as external data storage areas, to serve as a monitor for monitoring data being stored and/or accessed on the data storage areas.

A peripheral component interconnect (PCI) bus bridge 1014 connected to an I/O bus 1012 provides an interface to a PCI local bus 1016. A number of modems may be connected to the PCI local bus 1016. Typical PCI bus implementations will support four PCI expansion slots or add-in connectors. Communications links to computers 10, 11, 12 in FIG. 1 may be provided through a modem 1018 and a network adapter 1020 connected to the PCI local bus 1016 through add-in boards, or may be done through wireless communications, possibly via Bluetooth®.

Additional PCI bus bridges 1022, 1024 provide interfaces for additional PCI buses 1026, 1028, from which additional modems or network adapters may be supported. In this manner, a data processing system 1000 allows for connections to multiple network computers. A memory-mapped graphics adapter 1030 and a hard disk 1032 may also be connected to the I/O bus 1012 as depicted, either directly or indirectly.

Those of ordinary skill in the art will appreciate that the hardware depicted in FIG. 1A may vary. For example, other peripheral devices, such as optical disk or solid-state drives and the like, also may be used in addition to or in place of the hardware depicted. The depicted example is not meant to imply architectural limitations with respect to the embodiment of the server, it is simply an exemplary embodiment of a server, which is a primary component of the described systems and methods.

Herein, the terms "computer program medium," "computer usable medium," and "computer readable medium" are used to generally refer to media such as the main memory 1009, a removable storage drive 1031, a removable media 1033, a hard disk 1032, and signals. These computer program products are measures for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, solid-state drive memory, CD-ROM, DVD-ROM, and other permanent external storage. These memory applications are useful, for example, for transporting information, such as data and computer instructions, between computer systems. Furthermore, the computer readable medium may include computer readable information in a transitory state medium such as a network link and/or a network interface, including a wired network or a wireless network, which allows a computer to read such computer readable information.

Computer programs (also called computer control logic) are stored in memory. Computer programs may also be received through a communications interface such as PCI local bus 1016. Such computer programs, when executed, enable the computer system to perform the features as described herein. In particular, the computer programs, when executed, enable the processors 1002 and/or 1004 to perform the features of the computer system. Accordingly, such computer programs represent controllers of the computer system.

With reference now to FIG. 1B, a block diagram illustrating a data processing system is depicted in which the systems and methods may be implemented. A data processing system 1100 is an example of a computer 10, 11, and/or 12. The data processing system 1100 employs a peripheral component interconnect (PCI) local bus architecture. Although the depicted example employs a PCI bus, other bus architectures such as Accelerated Graphics Port (AGP) and Industry Standard Architecture (ISA) may be used. The processor 1102 and the main memory 1104 are connected to a PCI local bus 1106 through a PCI bridge 1108. The PCI bridge 1108 may also include an integrated memory controller and cache memory for processor 1102. Additional connections to the PCI local bus 1106 may be made through direct component interconnection or through add-in boards. In the depicted example, a local area network (LAN) adapter 1110, a small computer system interface (SCSI) host bus adapter 1112, and an expansion bus interface 1114 are connected to the PCI local bus 1106 by direct component connection. In contrast, an audio adapter 1116, a graphics adapter 1118, and an audio/video adapter 1119 are connected to the PCI local bus 1106 by add-in boards inserted into expansion slots. The expansion bus interface 1114 provides a connection for a keyboard and mouse adapter 1120, a modem 1122, and additional memory 1124, for example. The SCSI host bus adapter 1112 provides a connection for a hard disk drive 1126, a tape drive 1128, and a CD-ROM drive 1130, for example. Typical PCI local bus implementations will support three or four PCI expansion slots or add-in connectors.

An operating system runs on the processor 1102 and is used to coordinate and provide control of various components within the data processing system 1100 in FIG. 1B. Each user is able to execute a different operating system. The operating system may be commercially available operating systems, such as WINDOWS®, which is available from Microsoft Corporation. A database program such as ORACLE® may run in conjunction with the operating system and provide calls to the operating system from JAVA® programs or applications executing on the data processing system 1100. Instructions for the operating system, the object-oriented operating system, and applications or programs are located on storage devices, such as the hard disk drive 1126, and may be loaded into the main memory 1104 for execution by the processor 1102.

Those of ordinary skill in the art will appreciate that the hardware in FIG. 1B may vary depending on the implementation. Other internal hardware or peripheral devices, such as flash ROM (or equivalent nonvolatile memory), optical disk drives, or solid-state drives and the like, may be used in addition to or in place of the hardware depicted in FIG. 1B. Also, the processes of the system may be applied to a multiprocessor data processing system.

As another example, the data processing system 1100 may be a stand-alone system configured to be bootable without relying on some type of network communication interface, regardless of whether or not the data processing system 1100 includes some type of network communication interface. As a further example, the data processing system 1100 may be a Personal Digital Assistant (PDA) device or smartphone, which are configured with ROM and/or flash ROM in order to provide non-volatile memory for storing operating system files and/or user-generated data.

The depicted example in FIG. 1B and above-described examples are not meant to imply architectural limitations. For example, the data processing system 1100 also may be a notebook computer, a hand-held computer, a kiosk, or a Web appliance in addition to taking the form of a PDA or smartphone.

Figure 2:
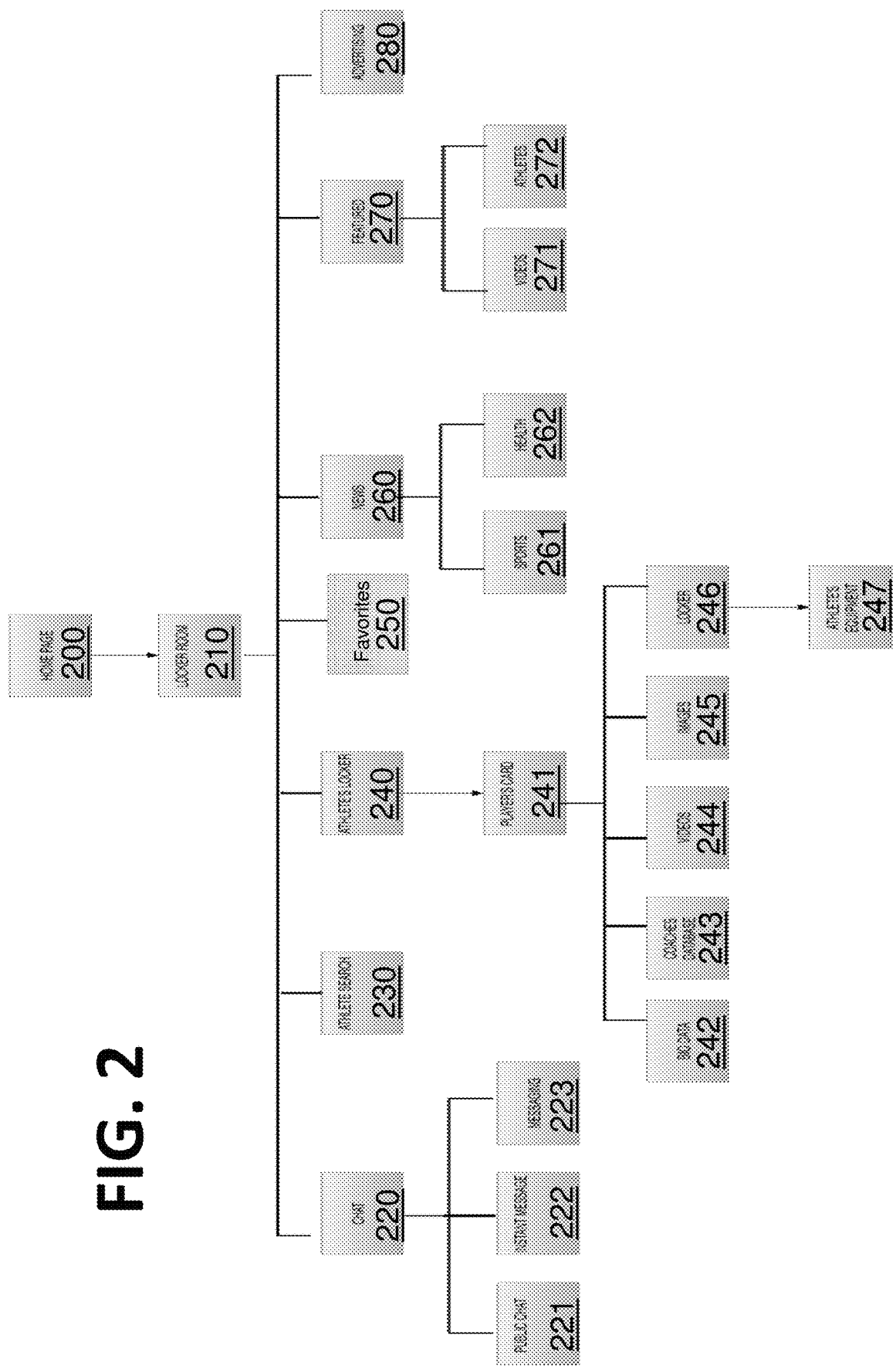
FIG. 2 is a functional diagram of an exemplary embodiment of a website architecture for a website supported by the server-based system of FIG. 1.

Referring to FIG. 2, when a user on the Internet accesses the URL of the server 13, the server 13 returns a data package to the interrogating computer that contains an HTML home page 200 that is displayed on the display screen of the interrogating computer, and that is organized with subsidiary links, for example, according to the diagram of FIG. 2. The homepage HTML data and the other pages of the website are stored at the server 13. The home page 200 and the other pages described herein may also be further populated with a variety of other scrips or functionalities in various languages or protocols, such as pop-ups, Flash ActionScript, WEB DL, Java applets, or a variety of other features and formats of Internet webpage design.

The home page 200, when accessed by the browser of the user's computer 10, 11 or smartphone 12, displays a log-in page with spaces for a username and a password, and a virtual button in the display that can be virtually pressed using the user's applicable input/output device, such as a computer mouse, when those fields are completed. In addition, there is an invitation to create a username account and password if the visiting user does not have one. The page also may contain a variety of other banners and advertisements or news items that are displayed as desired to the public visiting the homepage of the website.

Figure 3:
FIG. 3 is a screen capture of a rendered three-dimensional graphic of an exemplary embodiment of a locker room immersive environment as presented to a user viewer showing in front of the user a particular user's locker.

The user may enter his or her username and password and, on entry of a valid username and password, the home page 200 links immediately to a page that displays a locker room 210, which creates on the user's monitor an animated display, from a first-person point of view of the user, of doors opening and the user entering a three-dimensional (3D) immersive locker room environment. The locker room 210 displays on the user's monitor or screen a real-time rendering of a 3D immersive environment locker room. In an exemplary embodiment, the real-time view is a streamed video made up of sequentially streamed images, each of which is generated for the individual user for a respective point in time, preferably at a high enough speed between the image frames that the video changes smoothly based on movement of the user in the virtual environment or the user's actions in the virtual locker room environment. An exemplary embodiment of a single rendered image of this virtual environment is shown in FIG. 3. In addition, a virtual reality application may provide for a user to use a headset to enter into the 3D locker room and examine its contents.

The locker room system as a whole is within a virtual environment, meaning that the user navigates through it by simulated physical movement using the arrow keys of the keyboard of the computer, the mouse or joystick connected to the computer, or any other input/output device that may be developed in the future. In this 3D immersive environment, the user's individual locker or lockers 240 are organized around a central pillar, although any other organization of lockers is acceptable in the 3D environment. The lockers that are displayed in this locker room to the entering user are generally lockers associated with a group of other users whom the user has identified. This group can be a list of data identifying connected users linked to him or her, for example, as "friends" in other networks, or some other set of recognized users with whom the user has social contact in the locker room. In addition to linked third-party or other users being near the current user's locker, lockers of famous athletes or others involved in the sport in whom the current user is interested may also be in the area or adjacent the current user's locker 240, so that the current user can move through the 3D environment and access those lockers and view their contents quickly and easily, as will be discussed below.

Figure 3A:
FIG. 3A is a screen capture of the locker room environment of FIG. 3 after the user has selected and opened an individual's locker to reveal that individual's player's card and an interactive search panel.

In an exemplary embodiment shown with regard to FIGS. 3 and 3A, a locker 240 initially displays only the name of the individual who owns the locker 240. When the owner of that locker 240 clicks on the locker 240, two interactive "pop-up" windows appear, a search panel 40 and a player card 241. Each of these are described in further detail below. In contrast, when a third-party clicks on the locker 240 of a user, only the player card 241 appears.

As also seen in FIG. 3, the immersive 3D locker room imagery has the ability to show on its virtual walls various promotions 280 (e.g., advertisements, invitations, posters, banners) that can be accessed by the user by clicking on the promotion 280 and, through an associated website link, will take the user to other places in the locker room 210 or sites outside the locker room 210, such as preferred advertising pages or other pages that may be of interest to the user.

Figure 4A:
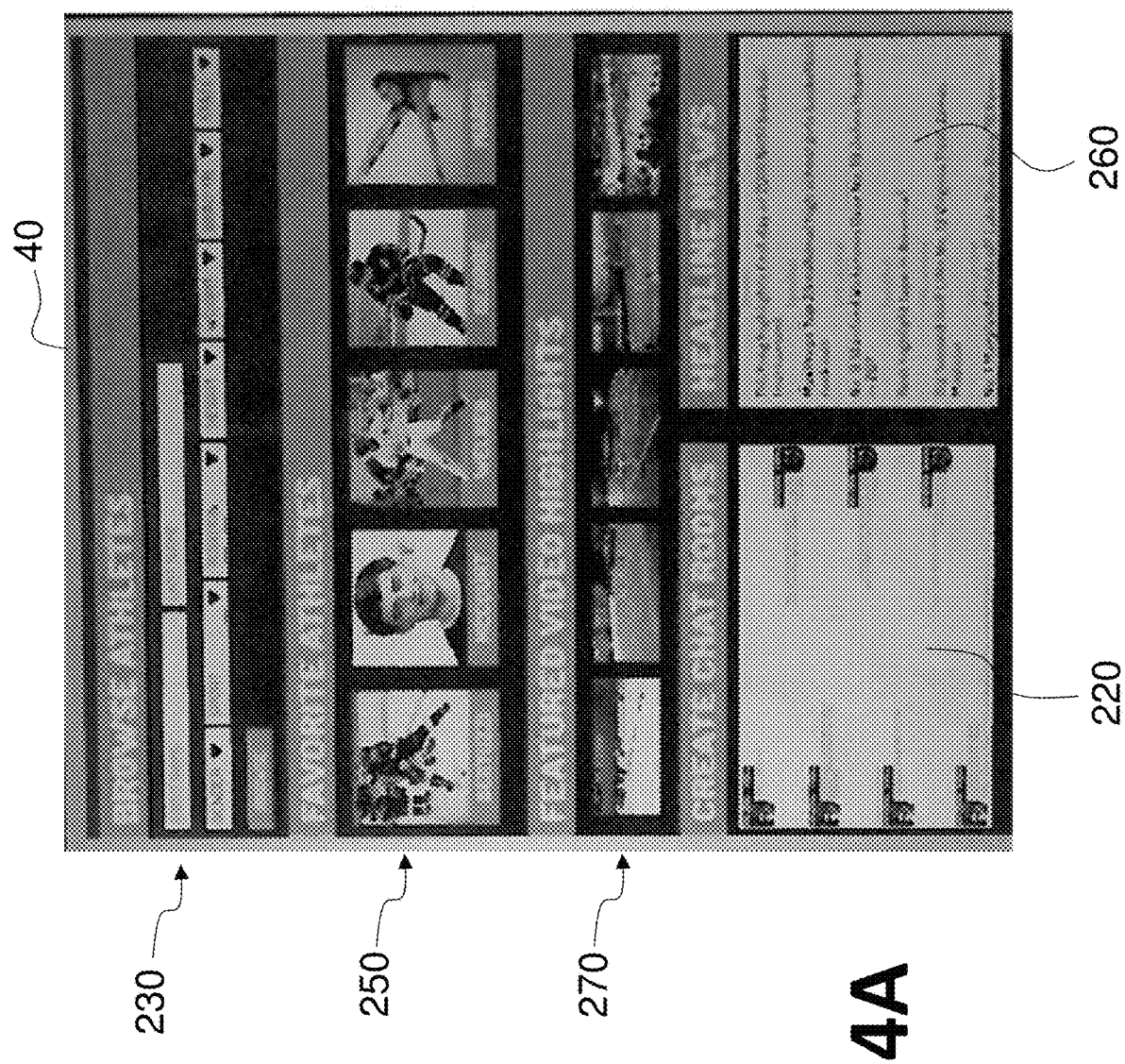
FIG. 4A is a partial screen capture of the interactive search panel of FIG. 3A.

The locker room view shown in FIG. 3 is an image that is displayed in a frame on the browser of the user, and does not occupy the entire display screen of the user's display. As depicted in FIG. 3A, the user's display shows additional areas including the interactive search panel 40 (an example of which is shown in FIG. 4A) and the player card 241, shown in FIG. 5, which are activated, in an exemplary embodiment, by providing a virtual button that the user can virtually push and, when activated, displays and gives the locker's owner access to both the interactive search panel 40 and the player card 241.

The interactive search panel 40 provides for a number of functionalities, as indicated in the functional map of FIG. 2. On the search panel 40, users may browse the system for information on a particular athlete in an athlete search panel 230. The athlete search panel 230 allows a user to view a locker 240 (for example, created by a famous athlete) by relying on a database search or query capability. This capability allows the user to search through all of the athletes (famous, not famous, professional, and amateur) that are users of the system, for example, by first name, by last name, by gender, by sport played, by position played, by height, by weight, by graduation year, by state, by school, and by a variety of other parameters, as seen in the entry spaces of the athlete search panel 230 shown in FIG. 4A.

Upon completing a browse-athlete search in the athlete search panel 230, the system returns a list of athletes conforming to the parameters of the desired search. Any of the athletes on the resulting list can be selected. Selecting a user-athlete from the list of query results by, for example, clicking with a mouse on the athlete's name or picture in the search results, triggers a redirect command sent to the server 13 that causes the server 13 to send to the browser of the searching user data packets defining contents of the locker 240 of the selected user-athlete, which can be opened. The browser will subsequently display the contents of the locker 240 of that user-athlete either automatically or after the user has clicked to open that locker 240, as shown in FIG. 3A.

On the search panel 40, users also may access a chat room 220, in which the user can initiate a chat or participate in existing chats with fellow users of their authorized group, with the user's connected user list, or with any set of users that are selected by the initiator of the chat. The chat room 220 allows for a public chat in public chat room 221 and also allows for an individual chat through an instant message window 222 or for individual message transmission to a listed connected user in message window 223 (see FIG. 2). The messaging windows 222, 223 function, for example, by allowing the user to communicate with his or her friends via a messaging facility whiteboard, or a user can transmit a message from the internal networking system to another user of the system by initiating the message in the system, which then sends a message from the network administrator to the recipient via that user's e-mail.

In this exemplary embodiment, a news panel 260 indicating relevant news is also displayed in the search panel 40, as is a set 270 of featured videos 271, 272 or other links (see FIG. 2), coupled ideally with promotions 280 relevant to the user. News links within the news panel 260 may divide into subsets of subjects of interest such as sports news 261 or fitness or health news 262, which are populated with additional links to news stores in those areas. Similarly, the link to featured videos 271, 272 directs the user to videos or videos of individual athletes that are potentially of interest to the user.

Another band of links is found at a favorite athletes panel 250, which shows a train of images or names of a group of athletes selected by the user that are of interest to the user. When a user selects one of the favorite athletes 251 by, for example, mouse-clicking on the displayed face or name, the server 13 redirects the user's view to the contents of the locker 240 of that favorite athlete 251. The favorite athlete's locker 240 may be set up by the athlete herself/himself as a user, or, in the case of famous or professional athletes, may be set up by the athlete's employer, team, school, agent, or fans, etc., or even by an employee of the company in charge of the systems/methods described herein.

Additionally, upon entering the search panel 40 for a first time, featured athletes and videos may be transmitted automatically to the interrogating computer from the server. The athletes and videos featured in the locker room will be determined and generated by the server, using, for example, an algorithm that calculates an average of likes and comments per video and display the video with the highest average as the featured video. This can be set to recalculate every day, week, or month. One exemplary embodiment for determining the highest average is set forth in the following example. A first video has twenty Likes and twelve Comments and an average of 16 is calculated according to the formula: (20+12)/2=16. A second video has thirty Likes and two Comments. Using this same formula, (22+2)/2=12, an average of 12 is determined. By comparing these two averages, the first video will be rated higher and, therefore, display as the featured video. If, however, the highest determined average is the same for multiple videos, then, in one exemplary embodiment, the most recently added video will display as the featured video. Alternatively, those with the same average can rotate by being displayed one after the other for each next viewer. This process is able, therefore, to determine which athletes, and which videos, would be most applicable or appealing to each individual user.

Figure 4B:
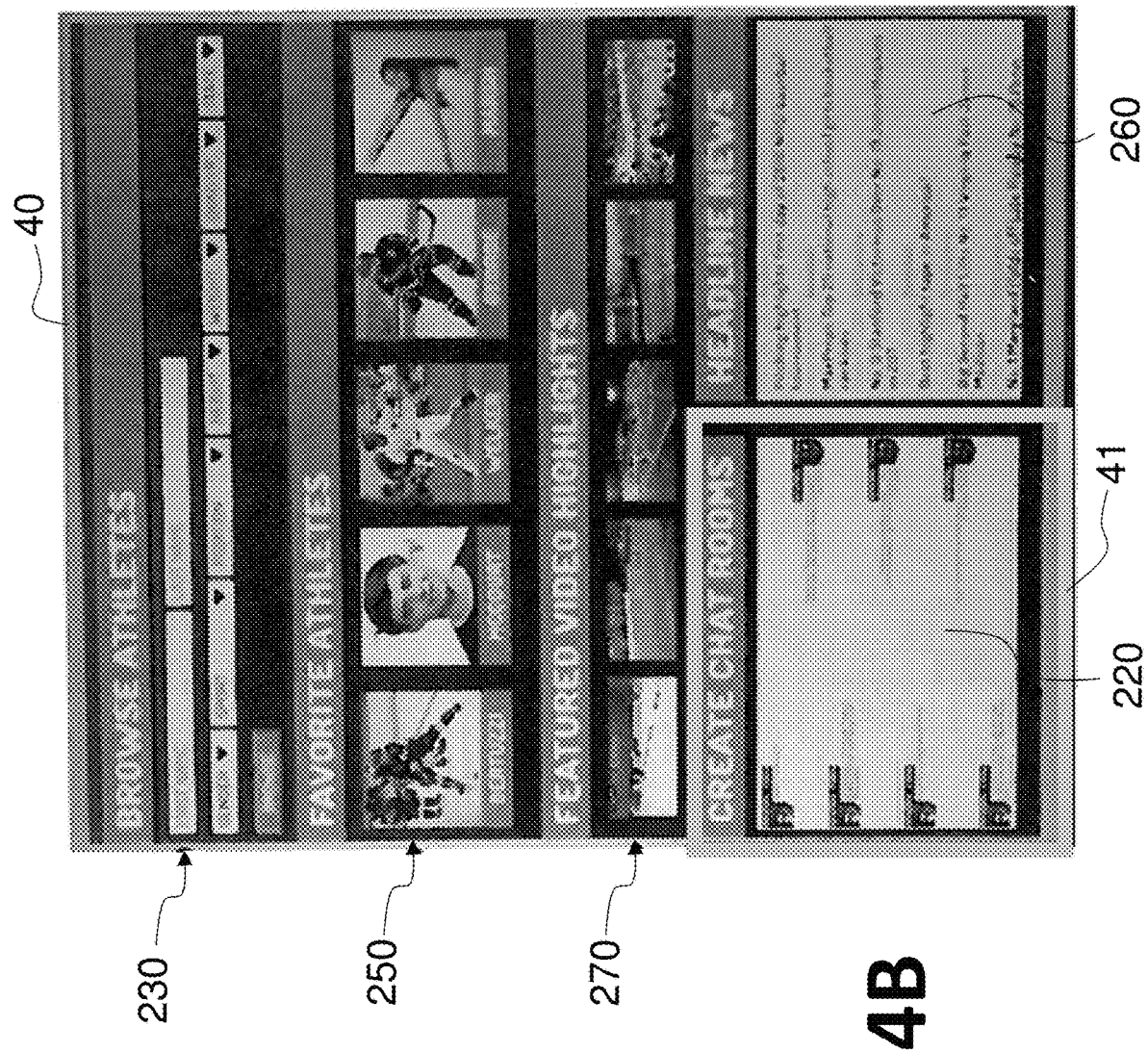
FIG. 4B is a partial screen capture of the interactive search panel of FIG. 4A with a chat feature selected.

To activate any one of the functionalities of the search panel 40, the user simply clicks or double clicks on that functionality, for example, the chat room 220, the athlete search panel 230, favorite athletes panel 250, the news panel 260 (sports new 261 and fitness/health news 262), the set 270 of featured videos 271 or athlete videos 272, or individual promotions 280, and the user is taken to a page that contains the relevant material or results. When clicked, prior to that shift, the specific area that has been selected is highlighted, as is seen in FIG. 4B for example, by an enlarged frame 41 surrounding the particular area within the search panel 40 having the desired functionality. FIG. 4B illustrates the search panel 40 after the user has selected the functionality of the chat room 220.

Referring to FIG. 2, the user who visits the locker 240 of another user can only see the player card 241 displayed to that visiting user. Any user on the system can go to any locker 240 and open it, for example, by simply clicking on the door of the virtual locker 240 in the locker room immersive environment. The door of the locker 240 opens through rendered or scripted animation and the visitor to the locker is shown, on the visitor's display device, a player card 241 of the user who owns the locker.

The owner of the locker 240, in contrast, can edit at least some of the contents of the user's player card 241, including biographical data 242, a coaches database 243, videos 244, images 245, an equipment locker 246, or other displayed content. Certain aspects of the player card 241 can be hidden or made public. For example, the owner of that locker 240 can make the player card 241 and locker 240 entirely public. Alternatively, the user can make the player card 241 and locker 240 visible to only to those other users who are directly connected to the user. In this regard, when the owner of the locker 240 opens the player card 241, the owner has access to a "Follow" button and an "Add Connection" button. When Follow is activated, the locker 240 is updated by adding the third-party user who was just Followed to the owner's profile and will be displayed in the feed section of that user's profile. When Add Connection is activated, that third-party user will be added to the owner's network of connections to others. In a locker edit mode, the owner is provided with those buttons that enable or disable the ability to Follow another user or to add a connection to another user. The user can also toggle a button to hide or show the locker 240 and hide or show the player card 241.

Figure 5:
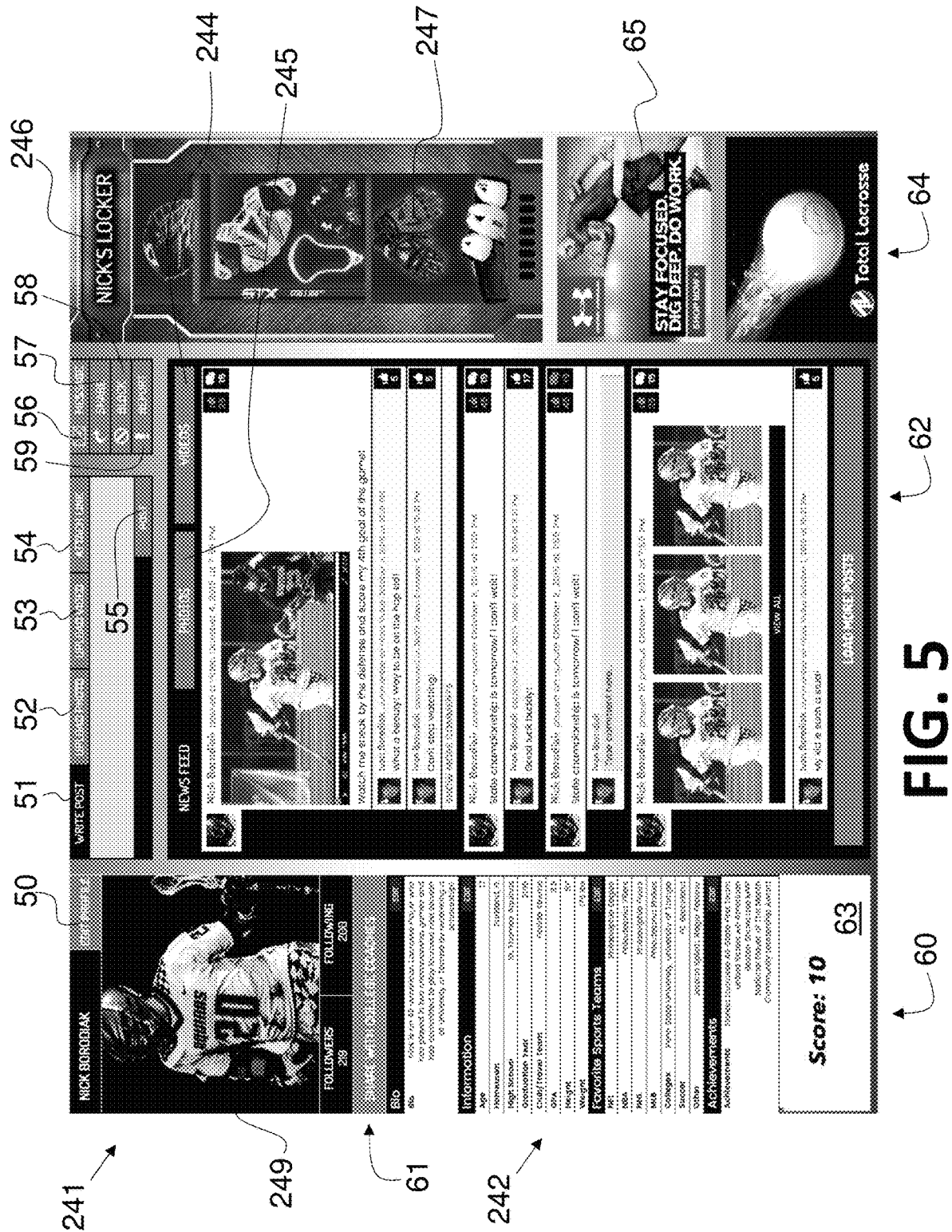
FIG. 5 is a partial screen capture of the interactive player's card of FIG. 3A.

FIG. 5 shows an exemplary embodiment of the contents of a virtual locker 240 as it is displayed to a user when the user logs into the home page 200, enters the immersive environment of the locker room 210, clicks on the door of another's locker 240, and then passes through to reveal the user's publicly available player card 241. FIG. 2, therefore, can represent the HTML link structure of the interior for the user's view of the locker 240. The user's view of the player card 241 is made up of a number of elements, including, but not limited to, the biographical data 242 associated with the user/player, a coaches database 243 (which may be maintained by the user, by a registered coach, or both; see FIG. 2), the videos 244 selected and uploaded by the user or authorized third-parties (such as a coach), and the images 245 selected and uploaded by the user or authorized third-parties (such as a coach). In addition, the locker 240 contains an equipment locker 246 in which the user may place links and/or images and/or thumbnails defining a collection of equipment 247 used by or preferred by or endorsed by the individual user.

In the particular exemplary embodiment of FIG. 5, the image shown is that which will be viewed by a user other than the owner of the locker 240 when the user has opened the locker 240. When so opened, the player card 241 is revealed and contains data provided by the owner-player, as well as data that has been developed or enhanced by the software processing of the player's data at the server 13 based on information provided by the player, for example, certain metrics of the player's abilities and performances that appear in a public form of the player card 241.

In exemplary embodiments, a user's locker 240 is capable of being viewed by anybody who locates the user in the system and contains public information of the associated player card 241 and, in this manner, the public player card 241 can be viewed by coaches and any other visitor.

Each player card 241 contains the biographical data 242, videos 244, and images 245 that are uploaded or authorized by the user/player who owns the player card 241. In exemplary embodiments, a user-editable version of the player card 241 includes a number of buttons that trigger scripts or links allowing the owner to alter the content of the player card 241. As seen at the top of FIG. 5, these buttons may include, for example, Edit Profile 50, Write Post 51, Upload Photo 52, Upload Video 53, Attach Link 54, Post 55, Message 56, Share 57, Block 58, Report 59, each of which allow a user to alter data regarding that player card 241 of the locker 240.

As seen in FIG. 5, the upper left hand corner of the player card 241 shows the name of the player and displays a photograph 249 of the user, as well as an indication of how many people follow the news or postings of the user (Followers 248) and how many other users this particular user is Following 249, in other words, the user has elected to Follow another user. A data sheet and scores prepared by analytics that are a series of calculations performed by software executed on the server 13 is shown in a left-hand column 60 of the player card 241. Additionally, a virtual coach-share button 61 allows the user to share his public player card 241 with college coaches of the user's selection.

The biographical data 242 provided in the left-hand column 60 includes, for example, the user's age, hometown, high school attended, high school graduation year, name of the club or team on which the user plays/played, grade point average (GPA), height, weight, and list of achievements or awards that the user has received, all of which may be edited or supplied by the user. Also included at the bottom of the left-hand side column 60 is a user's score 63, which is an analytic that represents an assessment of the player's abilities and skills in the given sport, relative to other users in the database. The administrating software of the server 13 derives the analytic score 63. In an exemplary embodiment, to determine the score 63, the system calculates an average of all performance statistics in each category that are fed into the athlete's player card 241 from a coaches application 300 (see FIG. 10A). A number is then assigned to performance average ranges. For example, a score of "5" is applied to averages of 80-100, and a score of "4" is applied to averages of 60-80, etc. Other value or values from statistics or data can be assigned as well.

A middle column 62 shows a continuously running newsfeed that is updated with news that is relevant to the user of the player card 241 and/or for other users either selected by the user or those who are followers 248 or following 249, for example. The middle column 62 also includes the virtual buttons used to access the videos 244 and images 245, as well as the control buttons (51 to 59).

In addition to the score 63, each player card 241 can also contain multi-dimensional scores based on different categories and abilities and sport. These additional scores can be derived, for example, by number of views, number of likes, number of shares, ratings, and statistics of the particular athlete user. A calculated score in each of these additional displays prompt the user to approve that score and requires an affirmative virtual click for approval to show the score(s) on the user's profile, either publicly or privately. These additional scores can be displayed next to the score 63 or they can be populated in a pop-up window that appears when a user of the system, for example, clicks on the box containing the score 63. New scores that are assigned to the user prompt the user to receive training and nutrition recommendations (the user must virtually click 'yes' or 'no' to accept). If these recommendations are requested and approved (by the user's affirmative approval), then the user will be required to input two weeks of performance data per each recommendation. This data is processed and incorporated into the system's recommendation algorithm, which is enhanced as the system gathers more information, thus expanding its database. The recommendation algorithm searches the database for players who are playing the same sport and are in the same age range and have the same gender, for example. Training/nutrition program recommendations from the top three performance averages or scores of the players can be displayed. The user is prompted to approve the scores before displaying in their player card 241.

Under this algorithm, data is analyzed according to a computer-implemented and computer-learned analytical model to produce equipment and nutritional recommendation to increase the athlete's performance. Specifically, the analytical component is specially programmed to analyze records in the database, recognize statistical patterns, and transactional relationships that can predict competitive opportunities according to the principles of machine deep learning. The prior art is replete with various computer intelligent learning systems for data analysis and, therefore, a significant number of references detail fundamental technologies that may be improved according to the exemplary embodiments described, or incorporated together to form a part of the present disclosure. To some extent, these technologies are disclosed and are expressly incorporated herein by reference to avoid duplication of prior art teachings. However, the disclosure herein is not intended to be limiting as to the knowledge of a person of ordinary skill in the art. Any recitation below of these teachings or reference to these teachings is not meant to imply that the inventors hereof were necessarily in any way involved in these references, nor that the claimed inventions disclosed herein were made or conceived after the publication of these references. Rather, recitation of these references is made to provide a background and to gain an appreciation of the pattern recognition and machine learning frameworks and theories that are utilized by the present systems, methods, and processes as it is disclosed here forth. In general, machine learning is an aspect of artificial intelligence that involves the creation and study of systems that can learn from data. Pattern recognition is one element of machine learning, whereby the data is mined for patterns and regularities in the data. The training of the machine to perform this recognition is, in some embodiments, through the use of neural networks (or other machine learning networks) that are trained with known input and outcome data to provide predictions with an acceptable level of accuracy, thus automatically inferring rules for recognizing statistical patterns and regularities. Accordingly, the networks are adaptive because they are reconfigured during training and during actual use to learn new rules or to find new patterns in new data. In some instances, the determined patterns may be complex and non-linear, such that their existence cannot be easily recognized by humans in the absence of machine intelligence. A detailed discussion of the fundamental aspects of machine learning and neural networks may be found in "Neural Networks and Deep Learning, Chapter 1: Using Neural Nets to Recognize Handwritten Digits" by Michael Nielsen, January 2016, Web. 10 Feb. 2016, the contents of which are fully incorporated herein by reference as though fully set forth. In addition, a thorough explanation of pattern recognition may be found in "Pattern Recognition," Web. 10 Feb. 2016 <https://en.wikipedia.org/wiki/Pattern_recognition>, the contents of which are also fully incorporated herein by reference as though fully set forth.

With respect to the present disclosure, in an exemplary embodiment, the analytical component is trained, according to the machine learning and pattern recognition principles discussed above, to recognize when an athlete has similar statistics with another athlete. In a further exemplary embodiment, the analytical component is trained to recognize increasingly complex statistical patterns. For example, the analytical component may recognize when an athlete can use a type of equipment and follow a certain nutrition regimen to increase their performance statistics.

Accordingly, the data that is gathered and stored in the database(s) is used intelligently by the automated system to produce meaningful correlations and indicators for identifying athletes with similar stats, thus making recommendations to increase performance statistics. Therefore, as the sheer volume of data in the system database(s) expands, the analytical results that are generated by the system become more refined and improved over time. The data gathered and the analysis performed is continuously evolving in real time and in a dynamic manner, and relies entirely upon the input of age, gender, sport, height and weight, and location of all athletes on the network, as well as performance data captured by a third-party device or inputted by the athlete themselves. One example of a third party device is an activity tracker called and manufactured by Fitbit®. Data from this tracker can be downloaded and utilized to enhance the biographical data 242 of a particular user/athlete. In this example, many data points can be included to define a particular athlete's biometrics. These data points could include, for example, resting heart rate, maximum heart rate, duration of exercise zone for heart rate, sleep duration, and amount of steps per day to name a few, Thus, as mentioned above, this type of data bank and statistical analysis cannot realistically be achieved solely within the human mind using a pencil and paper, as the knowledge of such a person would undoubtedly be limited in scope to just the human-reported data to which that particular entity or person is exposed. Furthermore, in view of the massive amounts of data accumulated over time, the systems and processes disclosed herein require the use of a non-human computing device to provide an analytical result that is both useful and remarkable. It would be impossible for the human mind, with or without the aid of a pencil and paper, to be able to store and recollect such large amounts of data and to carry out the recognition of statistical patterns and determination of correlations that take into account the entire data bank, which contains tens of thousands (or more) data points. One could not arrive at such an analytical result without utilizing the entire massive bank of data being stored in the system database(s). By employing machine learning, the entire data bank, which is continuously changing, can be effectively analyzed such that the analytical results will evolve and become more fine-tuned or accurate over time to an extent that is not possible in the human mind.

Figure 6:
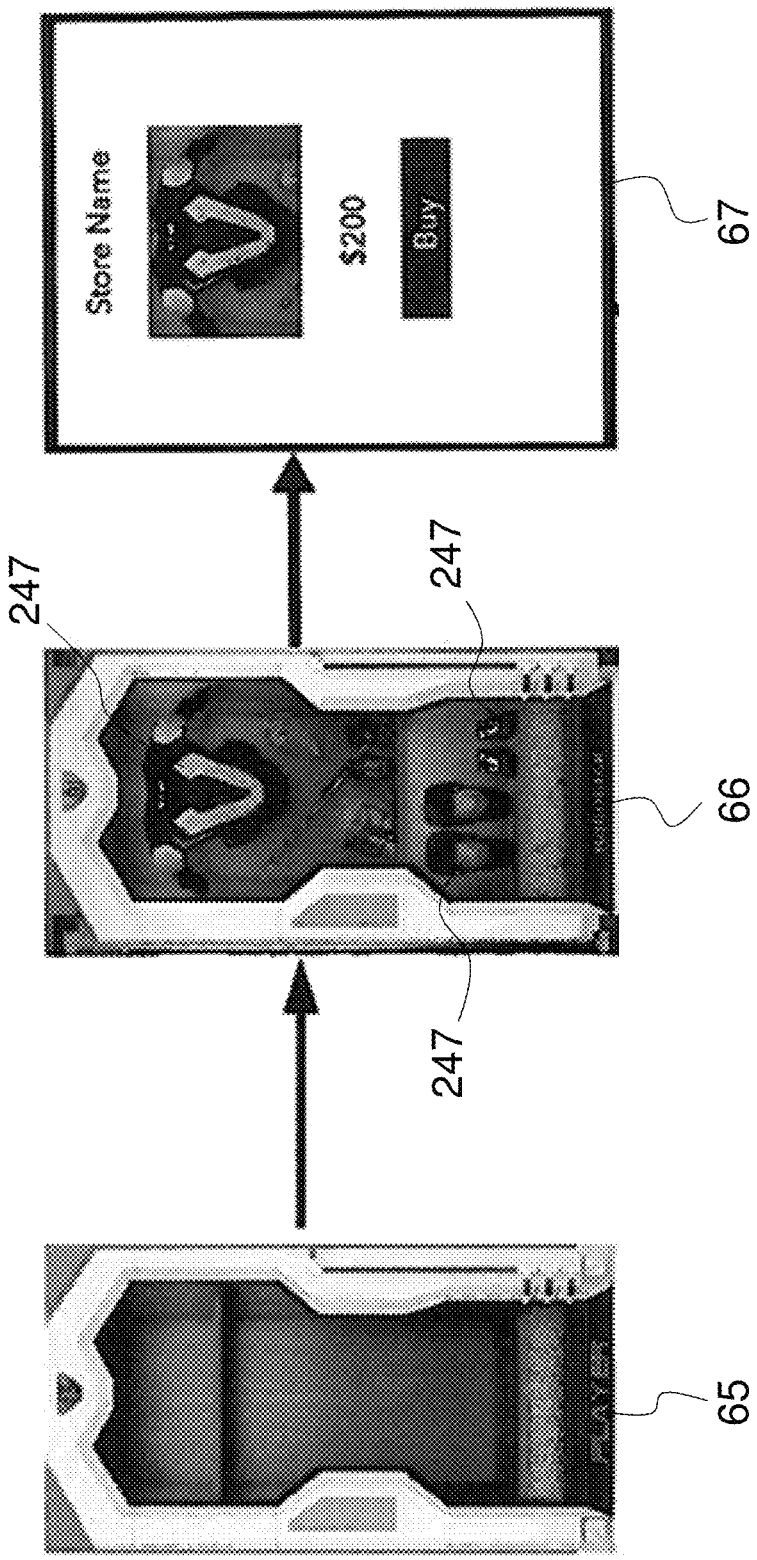
FIG. 6 is a set of partial screen captures of an exemplary embodiment of an interior of a user's locker in the system of FIG. 1 illustrating a process by which equipment is viewed or added to a user's equipment locker and the result of selecting a piece of equipment for view and/or purchase.

Continuing with the description of the player card 241, a right-hand side column 64 is made up of, at the top, the user's equipment locker 246 and, at the bottom, additional advertising content 66 that may be selected based on the user's activities or just in general by the manager/administrator of the website hosting the locker room 210. Contents of the equipment locker 246 in the form of selected equipment 247 are defined by the user, who is able to select choices from a list of possible equipment that the user uses or endorses. FIG. 6 illustrates an exemplary process by which the user loads the equipment locker 246 with equipment 247. Initially, an empty equipment locker 65 is empty and has no name associated with the equipment locker 246. Once assigned to the user, the equipment locker 246 is altered to have a unique identifier corresponding to the user, indicated with reference numeral 66, wherein the locker 246 shows the name of the user (e.g., along the bottom) and is populated in the center initially with standard equipment icons associated with the user's given sport. Thereafter, the identified equipment locker 66 is changed to show the exact equipment 247 used by or endorsed by the user.

Each piece of equipment 247 has a unique URL for that given piece of equipment and, if supplied by the system, a store associated with being able to purchase that piece of equipment. In one exemplary embodiment, any user visiting the locker and seeing the public player card 241 can click on the image of the individual piece of equipment 247 to activate a pop-up window 67 that is associated with a web link that, when activated, will take the view a description of the piece of equipment on display with an option to purchase and/or to a store website for purchasing that piece of equipment, where an online transaction will be offered for the viewer to buy the equipment. In an exemplary embodiment, the lowest three prices and respective selling stores found on the web will be displayed through a pricing data feed or a comparison shopping engine (CSE). In an exemplary embodiment, the store itself may be run by an administrator of the website for the locker room 210 (as opposed to an on-line retailer) and a pop-up window 67 may open to identify the product to be purchased and provide a virtual button allowing the visitor to buy that piece of equipment 247. When it is the user who purchases a piece of equipment 247, the associated information will become loaded equipment 247 owned by that user-athlete and will populate their personal equipment locker 246.

If a user elects to visit an online store for equipment purchases, the user's selections and purchases may be tracked, and the information may be used subsequently by the system to provide the user with suggestions for other equipment, and/or to provide the user with tailored locker room content or videos during future visits.

Users of the system input data about their sports activities and demographics and team information, etc., and that information is then integrated into a relational database of all the users of the system, their general demographics, and other attributes. The identification of equipment that is used by the user or athlete to whom a virtual locker 240 is assigned is also included in that database, which is organized so that it is possible to provide reports from the database of the number, percentages, and types of athletes who select specific pieces of equipment. This data may be offered or sold to manufacturers or resellers of equipment to allow them to better understand the relevant marketplace for their products.

The recommendation algorithm described above searches the database for user-athletes who are playing the same sport and are the same age and gender. Equipment recommendations from the top three performance averages or scores of the players are displayed. This will be displayed on a user's player card 241 after the player is prompted to approve and an approval by the user is given. The recommendation algorithm recommends equipment to the user-athletes based on gender, sport, statistics, location, and other athletes in the On the Hop (OTH) network. If the algorithm determines a direct match between an athlete and a piece of equipment, the athlete will be prompted to "buy now," at which point the user will be required to either virtually press 'no' or 'buy.'

Figure 9:
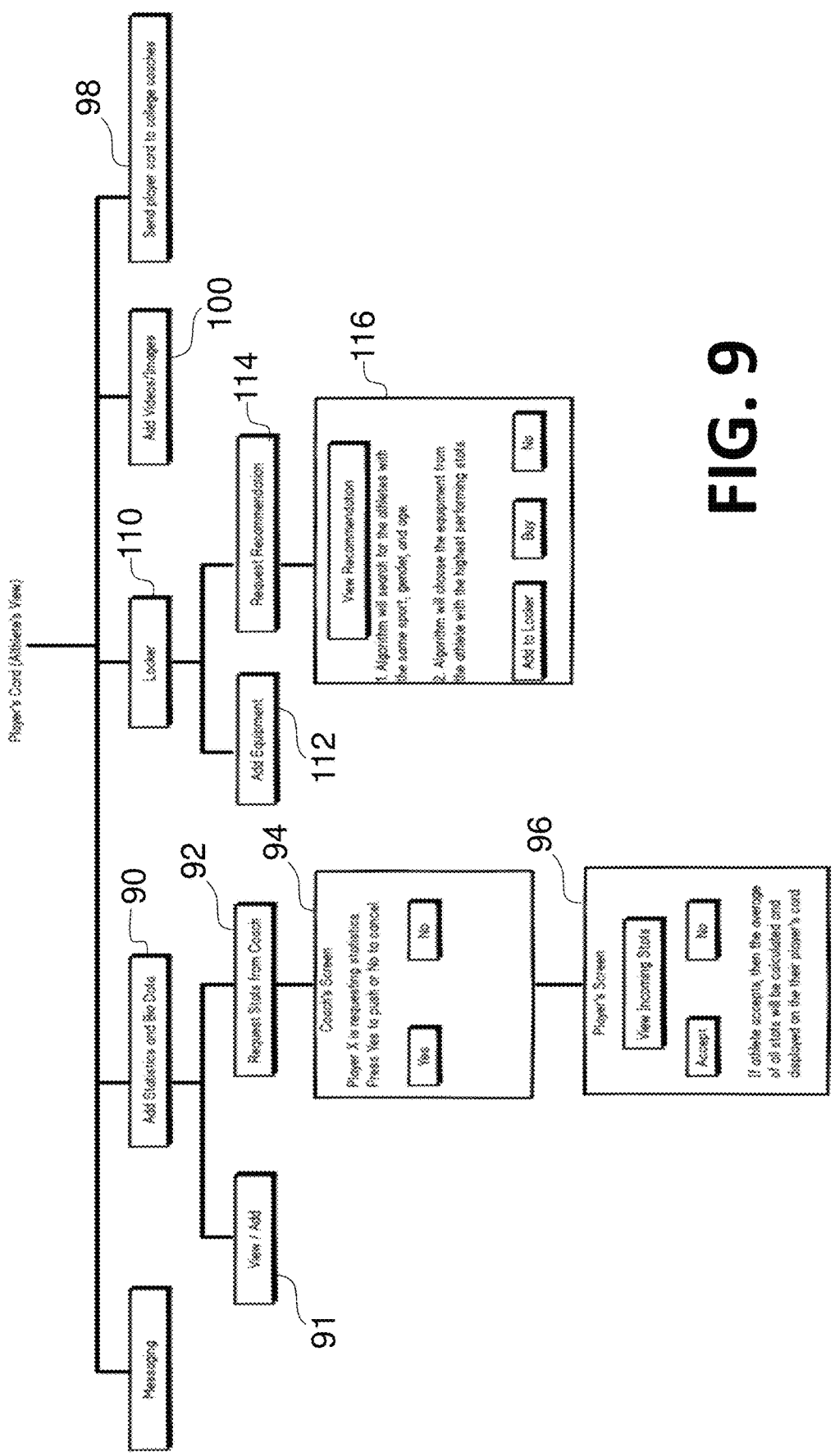
FIG. 9 is a tree chart of an exemplary embodiment for creating a player card.

A particularly desirable feature of the systems and methods herein is that they allow a user-athlete to transmit a virtual player card 241 by email to coaches in athletic programs of interest to the user-athlete. A process for generating and transmitting the player card 241 described below and is illustrated in the chart of FIG. 9. When first setting up the player card, the user logs into the system and selects a unique identification of the user. This identifier includes at least the person's name. In branches 90 and 91, the user adds statistics and biographical data 242. The user can also start the process for communicating with a coach or coaches in branch 92. The user can request information from the coach, such as statistics, in branch 94, or the user can request player statistics from a wearable device (e.g., something similar to a Fitbit® activity tracker). The wearable device captures data that include, for example, sprint and long-distance running times. When the player requests statistics data from the wearable device, the data will populate into the athlete's player's card upon approval from the athlete. As the data is fetched, the athlete will be prompted to approve by clicking a yes or no button, before the data can be populated onto the player's card. If the user is ready to communicate with the coaches, the user can select from the coaches database 243 a given number of coaches to whom the user wants to transmit the player card 241 in branch 96. Transmission of the player card 241 to the selected coaches occurs in branch 98. In an exemplary embodiment, when the player card 241 is transmitted outside the system to a coach, for example, it can be in a form that is readable by a simple separate player-card reader application. Transmission can occur by email or text or any other form of electronic data transfer. When recipients of a player card desire to read a player card, the recipient can open the app (similar to the way that Adobe Reader® opens a PDF file) and, with the app, read the player card 241 in a system-defined, easy-to-read format. The type of file can have, for example, a ".oth" extension in the file name, which makes the file able to only be opened with the player-card reader. The recipient can view the player card 241 in a 3D format, as well as chat and communicate with the athlete with appropriate embedded hyperlinks.

The owner of the player card 241 adds as many pictures 245 and/or videos 244 as desired in branch 100. Finally, the user selects the equipment 247 that is desired to be listed within the equipment locker 246 in branches 110 and 112. If desired, the user can obtain a recommendation for equipment 247 to be added to the equipment locker 246 in branches 114 and 116 and, further, can even buy equipment 247; the user can decide whether or not to add that purchased equipment 247 to the equipment locker 246.

The player card 241 is transmitted (e.g., by email) from the administrative software system of the server 13 to coaches who are selected by the user from a database of coaches. In this exemplary embodiment, the email includes the player card 241 or a link to the user's locker 240, which, when virtually clicked on, brings the email recipient to the locker 240 and to the public player card 241 of that user, along with his/her statistical and biographical data. If the communication includes the player card 241, the attachment will be in the .oth file format. When the .oth file is opened with the player-card reader, the athlete's 3D locker and player card 241 will be visible with the ability to chat and send messages between the sender and the recipient. It is noted that the Follow and Add Connection buttons are removed as irrelevant in this format.

Figure 7:
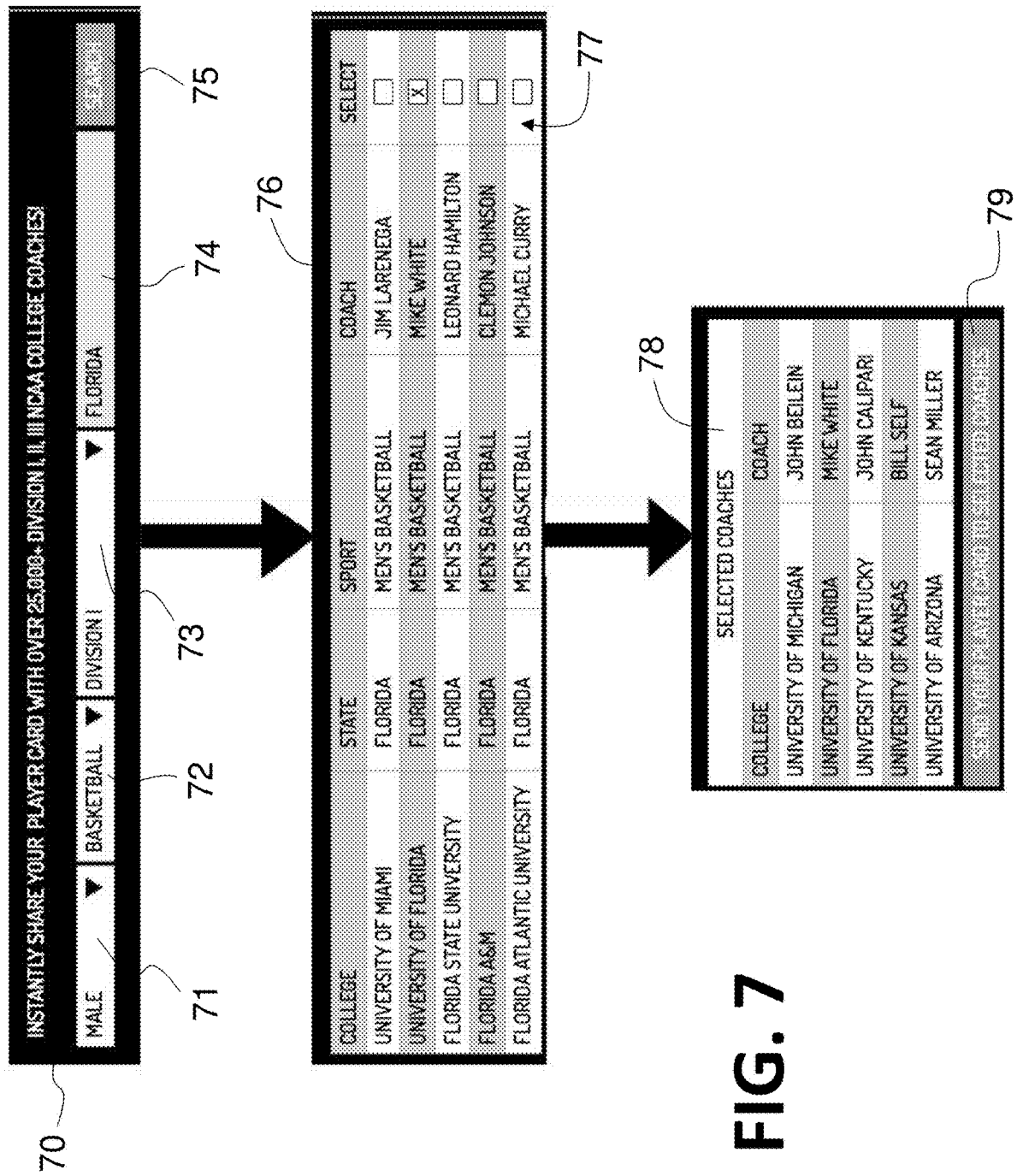
FIG. 7 is a diagram illustrating an interactive decision menu displayed to a user-athlete by which the athlete can distribute the user's information to selected coaches.

The process for transmitting the player card 241 is described with regard to FIG. 7. When a user wishes to present his/her public player card 241 to coaches for schools or teams for whom she/he would like to play, the user virtually presses the coach-share button 61 (see FIG. 5). This action initiates a script that opens up, in one exemplary embodiment, a window (or in another exemplary embodiment a pop-up) that allows for entry of data defining a search to be performed on a database of coaches (e.g., college coaches). This database is maintained by the administrating software of the system. The database is a searchable relational database containing data records with attributes of every coach (at the university level or higher) in the U.S. and any other countries that may be relevant or selected by the user.

A coach-share box or window 70 (seen in FIG. 7) appears when the button 61 is selected. In the exemplary embodiment of FIG. 7, the window 70 has pull down menus or data search fields for attributes or names associated with coaches, from which a subset of coaches may be obtained, each of which is of interest to the user-athlete for possible recruitment for the coach's team. The pull-down menus include, in this exemplary embodiment, a gender menu 71 that is used to select a gender of the team for which the coach represents, a sport menu 72 used to select the sport being played, a classification menu 73 for a particular division, class, and/or level of the team being sought (e.g., if the sport is at a collegiate level), and a location menu 74 used to select a town/city/county/district/state/country in which the team is located. Exemplary embodiments may include other menus with other attributes or parameters for a coach or a team or a location, for example, a team name or a team association (such as with a particular college).

Once the user selects the menus or data fields, a search button 75 is selected by the user, which triggers a results window 76 to open up that contains a listing of coaches who match the search parameters selected by the user. The results window 76 can be, for example, a pop-up window. The coaches are identified/selected by searching through the relational database by a query prepared based on the search input, with each coach being indexed by university, state, sport, team gender, and name, as well as other parameters for searching.

The result of such query is shown in the middle of FIG. 7. Coaches are listed in order of their relevance to the search conducted by the user, as seen in results window 76. Results window 76 also includes a column of control buttons 77 that can be each selected and, when selected, indicates the coaches to whom the user wishes to transmit his or her player card 241. Once the coaches are selected, a further transmission window 78 appears and lists the selected coaches by their school and the coaches' names. The transmission window 78 has a final transmit button 79 that, when selected, causes the system (on server 13) to transmit the player card 241 by to the selected coach or coaches (e.g., by email, text, mail). In an exemplary embodiment, the number of coaches that can be contacted is restricted to a predetermined limit, for example, five, which encourages the athlete to focus on specific coaches rather than just a wide broadcast that may be less successful in promotion of the user-athlete.

Upon reviewing the information on a player card 241, a coach may decide that he/she wants to contact the user. If contact is desired, then the coach has the option to click on a button located within the athlete's profile, which causes a message to be sent to the user notifying the user that the coach is interested and will be contacting the user soon. The option need not be restricted to an athlete's profile. Coaches may also be considered users of the system for searching or following up contacts from user-athletes. Coaches are provided with a user name and a password in the same manner as a user but do not need to have a locker, although a locker can be created if desired. Other facilities for coaches may be provided, such as access to the chat room(s) 220 and news feed(s) 261, 262, for example.

Figure 8:
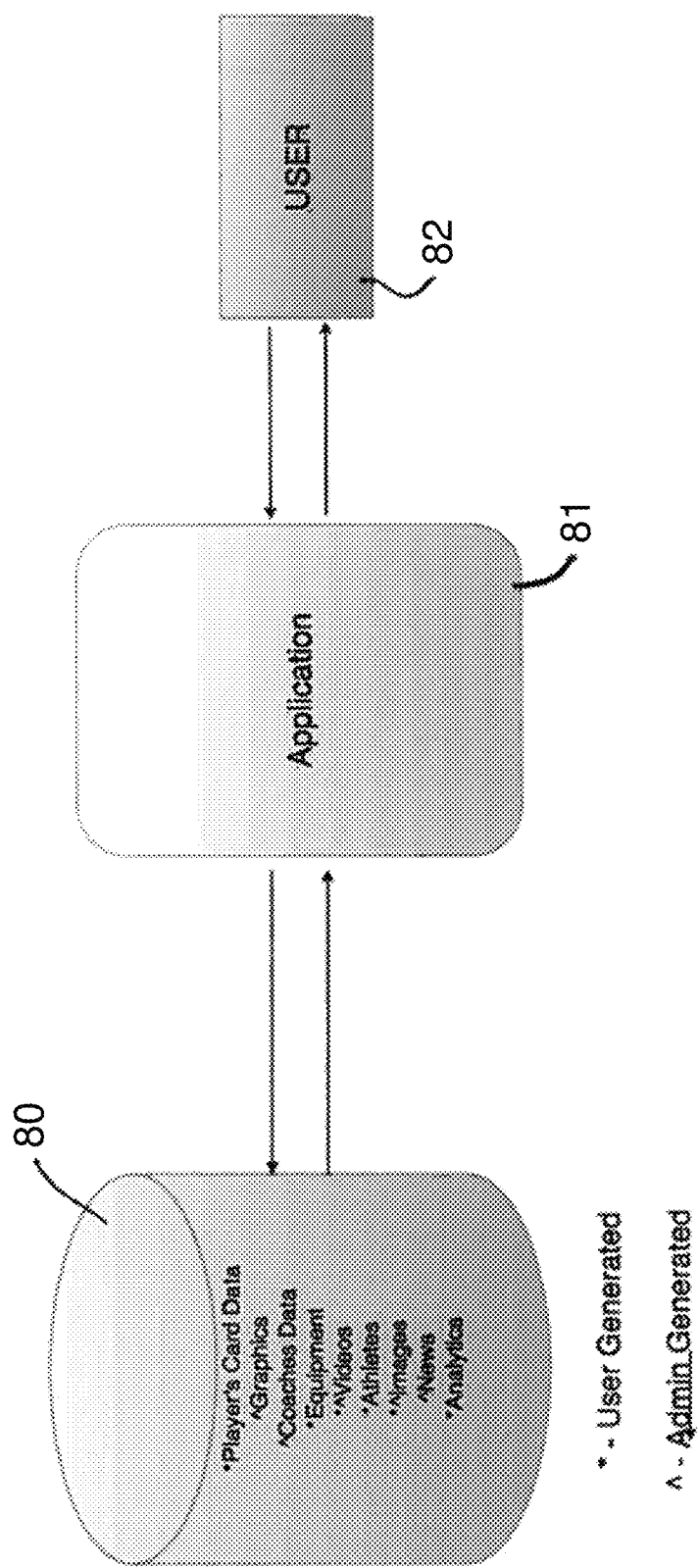
FIG. 8 is a block diagram illustrating a communication interfaced between the user and a database of the system of FIG. 1.

The specific architecture of the system from the user standpoint may vary. For example, in an exemplary embodiment, a relational database of users may be maintained separately from the coach database, or, in another exemplary embodiment, the two databases may be combined and supported (e.g., on the same mass storage device, as seen in FIG. 8). A user device 82 interacts with the complete database, including a coach database 80 supported on the server 13. Communication is accomplished through a communication device 81 that is running on the user's computer 10, 11 or smartphone 12, which can be in the form of the .oth player-card reader app mentioned above or in another form for transmitting and receiving electronic data. The communication device 81 has code written for the given user device 82, for example, an Android® smartphone or an iPhone®, or the communication device 81 may be a JavaScript or other program that executes in the browser of a computer 10, 11 that comprises the user device 82.

The system's relational database is made up of a number of primary data fields that are broken up into further indexed subfields. These primary data fields include, for example, player card data, graphics, coaches' data, equipment, videos, athletes, images, news, and analytics, each of which is described in further detail below.

In an exemplary embodiment, player card data can be in the form of a data packet created by the user to present the user-athlete according to a standard set of informational data, plus any other content the user wishes to include, plus some proprietary performance scores or analytic metrics determined by the server 13, as mentioned above in the description of the algorithm.

Coaches' data is a constantly updated relational database containing data defining all of the coaches who are relevant to any of the users, the data being broken down by the coach's name, state, school, team, sport, and other relevant data defining their responsibilities. This data, of course, is searchable by a query as a relational database and can yield a number of results that can be used for transmitting player cards 241 as has been described above.

Equipment data is selected by the user, who can select from an extensive list of equipment and providers who provide data defining equipment that the user may purchase and use. In an exemplary embodiment, the equipment data is linked through the administrator of the system to a store associated with the administrator to allow users who see this equipment to buy it through an online transaction.

Continuing with the description of the player card 241, videos are either uploaded by the user to play on the user's player card 241 or locker 240, or they may be selected by the user offline and automatically acquired and stored by the system directly into users' player cards 241 or locker 240 to provide news and other information that the user(s) may be interested in seeing.

Athlete data identifies all the user-athletes and contains indexed data fields relating to their sports, locations, attributes, etc. This relational database of the user-athletes can be searched using queries or other search techniques that rely on the organization and indexing of the database to locate relevant results.

Images may also be uploaded by the user or may be located by queries to the administrator and automatically placed as news or other data in the player cards 241 or lockers 240 of users who have specified various interests that may be associated automatically with pre-defined user queries.

News items may also be obtained and provided by the administrating software of the website to place in the newsfeeds of users interested in news on those subjects. As above, the news items may be placed automatically into user(s) player cards 241 or lockers 240 based on user-defined queries.

Analytics data develops an assessment of athletic abilities for each of the users, as well as a knowledge of the equipment used by the users sorted by various demographic and personal attributes of the users. The analytics data also develops a variety of other data that can be established based on the information uploaded to the administrator by the user and by the data that is available regarding the user's activity in the sport.

Figure 10A:
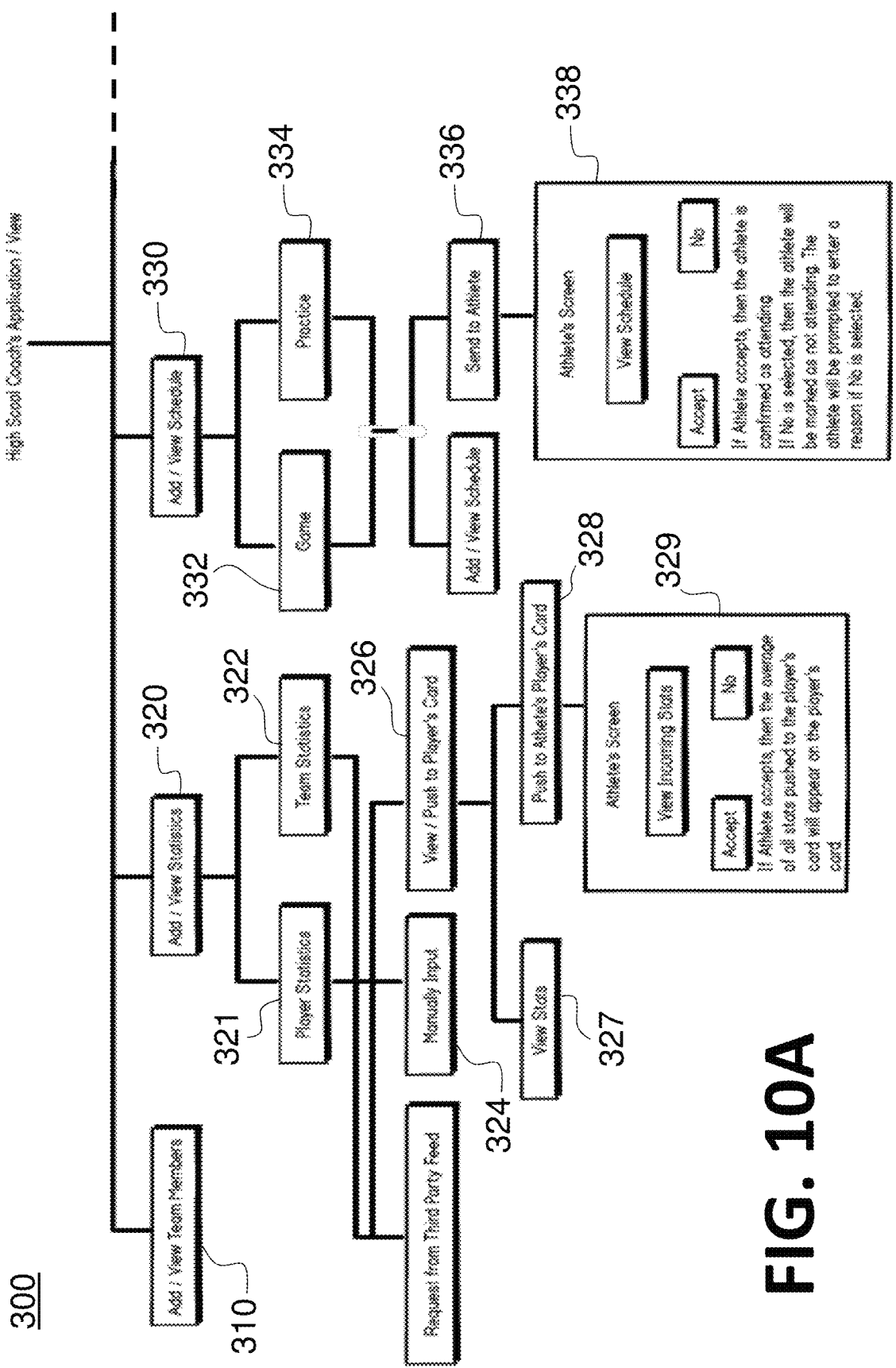
FIG. 10A and FIG. 10B together form a tree chart of an exemplary embodiment of a coaches application, the dotted line on the top right of FIG. 10A connecting with the dotted line on the top left of FIG. 10B to form a singular flow chart.
Figure 10B:
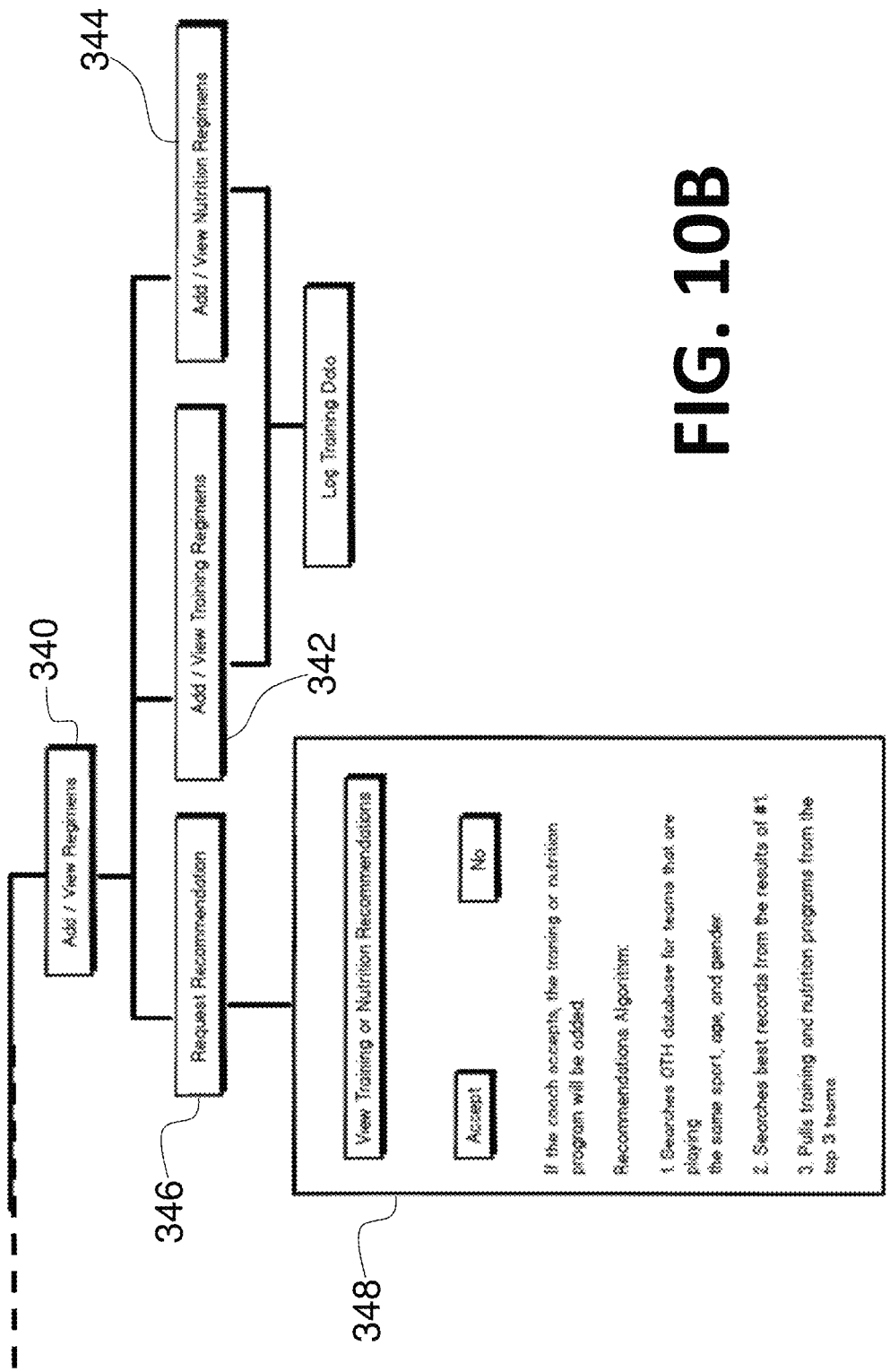

FIGS. 10A and 10B together form a tree chart illustrating a coaches application 300 and outlines how the systems and methods can be utilized by schools and/or teams. Coaches can add team members for each of the various types of sports in branch 310. Through branch 320, the coaches can add player statistics (branch 321) and game statistics (branch 322) to each of the team members. The statistics input by the coaches (in branch 324) are automatically fed into the athlete's player card 241, for example, after pushing a virtual button to send the entry/ies in branch 326. Approval of this information into the designated player card 241 can be automatic or it can be manually accepted by the athlete user.

The user can be required and prompted in branch 327 to view any changes and to approve those changes to the user's profile in branches 328 and 329.

Coaches can also create game and practice schedules in branches 330, 332, 334. Through this process, the coaches can additionally send messages to team members in branches 336 and 338, for example: "Practice is at 3 pm. Press [yes] if you will be attending." Based on this, player attendance can be predicted and tracked. All data is stored on the server 13. Analytics can provide graphs of, for example, wins and losses per player, per opposing teams, etc. The coaches can also be requested to add information about training and nutrition regimens of their players in branches 340, 342, and 344. This information is available to both the coaches and the players.

In this way the system can be given large amounts of data regarding particular teams' training regimens 342 and nutrition regimens 344 and, by correlating successful or unsuccessful win/loss records or player stats, the team or players can be ranked, thereby providing coaches with information about training and nutrition regimens that are "working" (i.e., for those teams with winning statistics or for those players who have higher than average personal statistics) and for those that are "failing" or "not working" (i.e., for those teams with losing statistics or for those players who have lower than average personal statistics). For example, the learning algorithm searches the On The Hop (OTH) database for teams that are playing the same sport, age, and gender. From the search results, training and nutrition programs are pulled from the top three team records. A coach can, thereafter, seek from the system a training or nutrition regimen that is comparatively "better" than the one that is currently in use by the coach or the coach can just select a highly rated regimen in branch 346. The coach for a given team is prompted to accept or select not to display the training and nutrition program in their application view in branch 348. When accepted, the algorithm provides recommendations on what the team needs to improve on based on stats, sport, and other team stats that are in the OTH network. The network administrator can view data for every team. In an alternative embodiment, instead of simply taking the regimens of the top team records, a machine-learning component could statistically recognize and associate certain features of regimens amongst top performers, for example, by comparing the stats, ages, genders, and regions.

With regards to the operation of the systems and methods, in operation, when a user enters into the website through the home page, the user becomes a moving avatar in a 3D interactive digital locker room 210, for example, as shown in FIG. 3. The user can create his/her own avatar or the application can create a set of avatars from which the user can choose. In an exemplary embodiment, the user can upload an image with pre-defined dimensions to be displayed on the body of the avatar. In the locker room 210, the user can view any number of lockers 240, which can be located by searching or simply by walking towards one. In addition, there may be avatars of other players in the locker room 210 or even of professional athletes or known entities who may be seen in this locker room environment. One way to identify an avatar is to display a user's name above the avatar's head. Alternatively, the face of the avatar could display a picture that the user downloads. 3D modeling techniques known in the art could also take an image of the person's head to place on top of the avatar in a more realistic representation.

Within the 3D virtual locker room 210, the user is able to move around in first-person movements using, for example, arrow buttons, a mouse, a joystick, or any other input/output device. Upon meeting other uses within the locker room, or by using the chat room 220 in the search panel 40, the user can chat with other users. In an exemplary embodiment, the avatars displayed to the user only include the user's connections who are currently online. If one user desires to interact with another user, the user can click on the avatar of the other user, which will bring them to the player card 241 and locker 240, in which chatting is made possible.

The user can also open lockers 240 of any other user to view that person's profile, as well as the data that the user places in that locker 240, such as equipment 247 of the user, and statistics of the user's performance, etc. As the user moves around the locker room 210 with first person 3D movement, various things may be encountered, generally including promotions 280 on the walls or other designated areas in the locker room 210 that may be selected if they are of interest to the user. The user also will see featured athletes and videos potentially projected on a surface or walking around inside the locker room 210 as a 3D rendering.

The systems and methods generate relevant athletes and videos that respond to the given user and are intended to educate the user about a particular sport or athlete, to cause the user to seek further information about the applicable athlete or video, or to cause the user to make purchases that are relevant to the applicable user's sport or past choices or preferences.

If a user is selected to be featured and, therefore, appear in the favorite athletes panel 250 of other users, then that user is prompted to approve his/her appearance in the system by virtually clicking "yes" to approve or "no" to prevent such exposure to other users. This does not have to be a repetitive selection for each time the user is online. For example, the user could be prompted once and, thereafter, the user will display in the featured athlete section visible to all of the other users.

The search panel 40 may also be used to search for other users and to locate their lockers 240 when moving as a first person through the 3D virtual environment of the locker room 210. This can be of particular importance when the user's location in the locker room 210 is not close to, or does not allow for easy access to, the particular locker 240 desired to be found. In an exemplary embodiment, the user can choose a set of top connections (e.g., 10, 15, 20) that are located on the same pillar or adjacent pillars of the user's locker so that movement to those connections is relatively quick and easy.

Links to advertising sites may be placed on the walls of the locker room 210 as promotions 280. Those advertisements are selected by the system based on the personal data information about the individual user who is navigating the locker room 210.

The profile of the user, for example, the player card 241, includes videos 244, images 245, and biographical data 242, all of which is organized in the user's locker 240 to be displayed according to a format that dictates how the player card 241 is displayed, and also videos of featured athletes 272 and offering other featured videos 271 to the user that are of interest to the user.

Once having entered the world of the 3D locker room 210, an image is rendered based on the point of view of the user within the virtual world of the locker room 210. This point of view is rendered using 3D rendering techniques and video corresponding to a series of images that are developed for the instantaneous position and viewpoint of a virtual eye of the user in the locker room, and are streamed to the receiving device of the user, for example, the computer 10, 11 or smartphone 12 over the Internet.

The user, having entered the locker room 210, can trigger an interactive pop-up window, the search panel 40 shown in FIGS. 4A and 4B, and search for athletes of interest by a number of parameters or by their names. The user can also visit the lockers 240 of favorite athletes to look at the current news or data that these athletes are posting. The user can review featured video highlights 271, 272 that are posted by the administrator of the website to observe things that might be of interest. Also, the user may access the chat room 220 to communicate with other connected users that are identified as a set of contacts for the user. Also, as discussed above, a streaming newsfeed of news headlines may also be presented to the user in a news panel 260 of this pop-up window.

When the user clicks on any locker 240 and "opens" it to see what is contained inside, the user sees images of the athlete's equipment and profile data, for example, in the form of that locker owner's player card 241. If the user is interested in purchasing equipment, a virtual click on the athlete's equipment will link to a URL pointing to a store either run by the administrator, or at another website to allow for purchase of the selected equipment. The referral to another website or a partner store may be counted for purposes of developing a revenue stream, as would the sale of a product by a website so referred.

In the chat room 220, the users have the ability to chat through a public chat room 221, as well as chat through an instant message (via instant message window 222) or through a private message (via message window 223). If a public chat is desired, the user can create a topic for the public chat, and subsequently launch the new chat topic. All users can then view and monitor this public chat thread and participate. For example, any user can join the chat, if it is of interest to them. It is additionally possible that video or voice chat could be provided for users that find this ability desirable.

Chatting through an instant message may also be performed by the user through their connection list, which represents their "friends" in the system. In this form of chatting, voice chat is supported as well through the server 13 or some other linked communication service.

Private messages may be sent by the user composing a message and sending it to a connection, or "friend," of the user. Upon receipt of a private message, the recipient of the message is notified of the private message by virtue of a dialogue box, or similar pop-up box, which signifies a message received, where the recipient has the option to respond or ignore this private message from the other user. Additionally, users have the ability to block private messages from other users if so desired. If this is the case, the locker room administrator's system prepares any message received by such user and transmits it, for example, as an e-mail from the administrator's service.

An athlete search 230 is performed by users searching for athletes on the network, and each search, or query, can be distinguished by sport, age, location, high school, gender, and, optionally, a metric score, all of which are listed in the search pop-up window. The metric score itself is a metric of the athlete based on the athlete's historical performance, as well as other information, which can include, but is not limited to, height, weight, age, school, etc. Once a successful search is performed and a desired user is located, the user who performed the search is brought directly to that athlete's locker 240, and can subsequently virtually look inside that locker 240 to see the publically available contents thereof, including the aforementioned player's card 241, which contains the biographical data 242, the coaches database 243, videos 244, images 245, equipment locker 246, and athlete's equipment 247 inside of the equipment locker 246.

Appearance of the locker 240 of another user-athlete when opened is similar to that shown in the example of FIG. 5, except that modifications, uploads, and other user-only buttons will not be present. A player card 241 as described above is created with biographical data 242, videos 244, and images 245. In an exemplary embodiment, the user can post updates on another user's player card 241, and can also follow other athletes and display showcases and programs that the user is attending. In this regard, the player card 241 has flexibility as a social media platform. In addition, the player card 241 contains multi-dimensional scores for different categories and abilities, which vary per sport played by the user-athlete. Each of these scores is calculated by views, such as shared ratings and athlete statistics, which are all determined using the machine-learning algorithm of the system. In an exemplary embodiment, the algorithm calculates an average of each performance category and a score is assigned to a range of averages. From this, each user-athlete's scores are analyzed, with a higher range equating to a higher score.

As mentioned previously, the systems and methods herein allow for equipment to be sold through users clicking on products in the athlete's equipment lockers 246. An administrative aspect of the system accomplishes this by having a user upload an image and a description of the equipment that he or she uses, thereby permitting the system to identify and catalog this piece of equipment. Subsequently, the system generates and assigns a URL to the image of equipment in the user's locker so that visitors to the user's locker can purchase the equipment by clicking on the image in a store located by the administrator of the system. In an exemplary embodiment, the system selects the store based on the brand, model, best price, and location of both the user and the store for shipment. Or, the store can be selected based on a contract with the administrator of the system.

Featured videos 271 and athlete videos 272 are selected for each user-athlete based on the score, or other calculated metric, of the user, which determines which videos 271, 272 are featured. The videos can be found from the Internet or can be supplied to the system by users and given tags that identify whom would be interested or the subject matter of the videos so that they can be assigned to users. Then, the featured videos 271, 272 can be filtered by state, city, school, sport, and/or gender, which provides the most relevant featured videos to each user. Featured videos 271, 272 are also selected based on data available to the administrator, for example, by likes, comments, and/or shares of various videos available for posting. These videos can also be filtered by state, city, school, sport, or gender to make them more relevant to the user.

News 261, 262 is transmitted to the user in the most recent and up-to-date form for youth, college, and professional sports. This news can be fed from a third-party news source, for example, local television sports programs, or by a particular online news channel, such as ESPN®. News can also arise from the system itself to showcase success of particular teams or athletes, whether professional or amateur.

Athlete statistics that are tracked and measured per athlete by state, city, gender, sport, and age, and are all tracked and stored in the database of the server 12. In addition, other aspects of the player, such as position played, and any of a variety of other factors that may be considered in assessing the performance and analysis of a player, may be employed by the custom analytics developed by the system. In addition, equipment usage can be polled across an entire population of the athlete users. This means that any specific desired brand and/or model of equipment can be tracked and measured in terms of their use, per athlete, by state, by city, and/or by age of the athlete. This information is invaluable for marketing purposes of the equipment manufacturers, and is unavailable from any other location in any reasonable way. Furthermore, in a similar manner, this information can also be used as a source of financial income for the administrator of the system, in addition to any benefits that the administrator may receive for linking users to the stores who are selling the equipment.

Users can view up-to-date fitness or health news 262 as well sports news 261 about players and others relevant topics associated with a particular condition, or if applicable, their own condition.

The score 63 associated with the player card 241 calculates an average score of each performance category. For example, a score of "5" is applied to averages of 80-100. A score is assigned to a range of averages, where a higher range equates to a higher score. With this in mind, it is understood that a score of "4" is applied to averages of 60-80. This is a metric by which the player's ability is evaluated and given some value, which is of interest to coaches who could be recruiting such user-athletes, as well as to players who want to compare themselves to other user-athletes.

In an exemplary embodiment, the equipment 247 sold in the locker room 210 is provided with a URL based on a process that searches for the lowest price on the Internet. The administrator is prompted to accept or cancel each lowest price or the selection can be done automatically. If accepted, the URL is assigned to a piece of equipment, and subsequently linked to the store that provides that piece of equipment for sale.

The set 270 of featured videos 271 and athletes 272 are also selected for the user based on the user's data and actions.

Custom analytics, such as data reported for the usage of equipment or number of people following an athlete, is a valuable source of information for companies who are selling equipment, and also for athletes who are looking to promote their own following.

It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

The foregoing description and accompanying drawings illustrate the principles, exemplary embodiments, and modes of operation of the systems, apparatuses, and methods. However, the systems, apparatuses, and methods should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the systems, apparatuses, and methods as defined by the following claims.

What is claimed is:

1. A system for utilizing athlete data, comprising:
a host server connected to the internet and hosting a host application configured to:
communicate with computers separate from the host server and connected to the host server through the internet, the computers comprising at least one of a second server, a desktop, a laptop, a tablet, and a smartphone;
host a coach database comprising, for each coach, attributes including at least one of a coach name, a team name, a team gender, a team sport, a team association, a team classification, and a team location;
receive player information from one or more players and store the player information within a unique player card associated with the player, the player information comprising:
the player's unique identification;
at least one picture of the player;
biographical information about the player; and
sports equipment selected by the player;
render a graphical representation of a locker room environment comprised of at least one player locker, each of the at least one lockers being associated with one player and comprising the unique player card of the associated player;
receive from the associated player a subset of coaches selected from the coach database; and
transmit the unique player card of the associated player through the internet to at least one coach contained within the selected subset of coaches by at least one of email and text; and
a player-card reader hosted on at least one of the computers separate from the host server and configured to display to a user of the at least one computer the player information contained within the transmitted unique player card in a standardized display format.

2. The system according to claim 1, wherein the host application is configured to send the unique player card to the subset of coaches contained within the coach database who are selected by the player.

3. The system according to claim 1, wherein the host application receives at least some of the player information from a coach associated with the player to store within the unique player card.

4. The system according to claim 1, wherein the player-card reader also displays a hyperlink that, when selected, re-directs a browser of the at least one computer to the player locker of the player who sent the unique player card and displays the player information present within the player locker.

5. A system for utilizing athlete data, comprising:
a host server connected to the internet and hosting a host application configured to:
communicate with computers separate from the host server and connected to the host server through the internet;
host a coach database comprising, for each coach, attributes including at least one of a coach name, a team name, a team gender, a team sport, a team association, a team classification, and a team location;
receive player information from one or more players and store the player information within a unique player card associated with the player, the player information comprising:
the player's unique identification;
at least one picture of the player;
biographical information about the player; and
sports equipment selected by the player;
render a three-dimensional graphical representation of a locker room environment comprised of at least one player locker, each of the at least one lockers being associated with one player and comprising the unique player card of the associated player;
receive from the associated player a subset of coaches selected from the coach database; and
electronically transmit the unique player card to at least one coach contained within the selected subset of coaches; and
a player-card reader hosted on at least one of the computers separate from the host server and configured to display to a user of the at least one computer the player information contained within the transmitted unique player card.

* * * * *